US009513450B2

(12) United States Patent
Yamauchi

(10) Patent No.: US 9,513,450 B2
(45) Date of Patent: Dec. 6, 2016

(54) OPTICAL FIBER CABLE SPLICING BOX

(71) Applicant: 3M INNOVATIVE PROPERTIES COMPANY, St. Paul, MN (US)

(72) Inventor: Takaya Yamauchi, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 12 days.

(21) Appl. No.: 14/378,989

(22) PCT Filed: Feb. 19, 2013

(86) PCT No.: PCT/US2013/026656
§ 371 (c)(1),
(2) Date: Aug. 15, 2014

(87) PCT Pub. No.: WO2013/130301
PCT Pub. Date: Sep. 6, 2013

(65) Prior Publication Data
US 2016/0018614 A1    Jan. 21, 2016

(30) Foreign Application Priority Data

Feb. 29, 2012  (JP) ................................ 2012-043973
May 9, 2012    (JP) ................................ 2012-107446

(51) Int. Cl.
*G02B 6/00* (2006.01)
*G02B 6/44* (2006.01)
(Continued)

(52) U.S. Cl.
CPC ........... *G02B 6/4442* (2013.01); *G02B 6/2558* (2013.01); *G02B 6/4422* (2013.01); *G02B 6/4429* (2013.01);
(Continued)

(58) Field of Classification Search
CPC ... G02B 6/4454; G02B 6/4429; G02B 6/4446; G02B 6/4442; G02B 6/2553; G02B 6/2558; G02B 6/2555
(Continued)

(56) References Cited

U.S. PATENT DOCUMENTS 4,986,625 A    1/1991  Yamada
5,016,963 A    5/1991  Pan
(Continued)

FOREIGN PATENT DOCUMENTS

JP    03-152503 A    6/1991
JP    06-094950 A    4/1994
(Continued)

OTHER PUBLICATIONS

Search Report for CN201380011672.6, dated Jun. 3, 2015, 2 pp.
(Continued)

*Primary Examiner* — Kaveh C Kianni
*Assistant Examiner* — Hung Lam
(74) *Attorney, Agent, or Firm* — Janet A. Kling

(57) ABSTRACT

An optical fiber cable splicing box is provided that can easily connect together optical fiber cables that include a metal wire and an optical fiber. Optical fiber cable splicing box 1 includes a pair of cable holders 3A, 3B aligned in a predetermined direction fixed to a body 2, a mechanical splice 4 that optically connects together ends of optical fibers 91A and 91B, a pair of contact portions 80A and 80B respectively provided on the pair of cable holders 3A and 3B, and a metal plate 5 having conductivity. The contact portions 80A and 80B include a first connecting portion 84c that is electrically connected to metal wires 92a and 92b of optical fiber cables 90A and 90B by penetrating into a jacket
(Continued)

94, and a base portion 83 that is electrically conducting with the first connecting portion 84c and electrically connected to a metal plate 5.

7 Claims, 28 Drawing Sheets

(51) Int. Cl.
  *G02B 6/255* (2006.01)
  *G02B 6/38* (2006.01)
(52) U.S. Cl.
  CPC ............ *G02B 6/4447* (2013.01); *G02B 6/3801* (2013.01); *G02B 6/4477* (2013.01)
(58) Field of Classification Search
  USPC ............ 385/55, 56, 62, 81, 87, 95, 135–137
  See application file for complete search history.

(56) References Cited

U.S. PATENT DOCUMENTS

| | | | |
|---|---|---|---|
| 5,472,160 A | 12/1995 | Burek et al. | |
| 5,684,911 A | 11/1997 | Burgett | |
| 6,151,436 A | 11/2000 | Burek et al. | |
| 7,014,372 B2 | 3/2006 | Watte et al. | |
| 7,775,726 B2 | 8/2010 | Pepin | |
| 7,862,245 B2 | 1/2011 | Watte et al. | |
| 2008/0107381 A1* | 5/2008 | Nishioka | G02B 6/3829 385/60 |
| 2009/0034917 A1 | 2/2009 | Burwell | |

FOREIGN PATENT DOCUMENTS

| | | |
|---|---|---|
| JP | 09-304630 A | 11/1997 |
| JP | 2003-066240 A | 3/2003 |
| JP | 2003-240971 A | 8/2003 |
| JP | 2007-078746 A | 3/2007 |
| JP | 2008-203409 A | 9/2008 |
| JP | 2008-233695 A | 10/2008 |
| JP | 2010-054680 A | 3/2010 |
| JP | 2010-145951 A | 7/2010 |
| JP | 2011-095454 A | 5/2011 |
| KR | 102272646 A | 12/2011 |

OTHER PUBLICATIONS

Notice of Allowance for RU Appl. No. 2014131133, dated Oct. 7, 2015, 7 pp.
International Search Report for PCT/US2013/026656, mailed on May 29, 2013, 4 pp.
Supplementary Search Report for EP13755379, dated Sep. 2, 2015, 3 pp.

* cited by examiner

OPTICAL FIBER CABLE SPLICING BOX

BACKGROUND

1. Technical Field

The present invention relates to an optical fiber cable splicing box, and particularly relates an optical fiber cable splicing box that connects together optical fiber cables that include metal wiring and optical fiber.

2. Related Art

Conventionally, equipment that can easily increase the number of optical fiber cables when expanding a fiber to the home (FTTH) network has been in demand, and for example, an optical fiber splicing box that connects by matching ends of a pair of optical fiber cables in a given direction when increasing the number of optical fiber cables has been in wide use. For example, an example of this type of art is given in Japanese Unexamined Patent Application Publication No. 2010-145951 (Patent Document 1) which describes an optical fiber splicing box designed to make the work of connecting optical fiber easier.

The optical fiber splicing box described in Japanese Unexamined Patent Application Publication No. 2010-145951 is provided with a housing, a pair of sandwiching members that make up a mechanical splice that sandwiches the ends of exposed optical fibers, a spring member holding the sandwiching members, two insertion units that hold the sandwiching members apart, a first guide where a jacket gripping portion that grips the jacket of a first optical fiber cable is arranged within the housing, and a second guide where a jacket gripping portion that grips the jacket of a second optical fiber cable is arranged within the housing. The length of a first optical fiber exposed from the first optical fiber cable is adjusted so that the tip end of the first optical fiber protrudes from the tip end of the first guide to a second optical fiber side.

OUTLINE OF THE INVENTION

Problems to be Solved by the Invention

However, an optical fiber cable that contains an optical fiber as a core wire and a metal wire as a tension member, such as in an optical drop cable, is known. Mutually matching and connecting this type of optical fiber cable requires that the respective optical fibers are optically connected together and that the respective metal wires are electrically connected together to secure a ground.

However, while the conventional optical cable splicing box described above can optically connect optical fibers together, separate work is required to expose the metal wires by stripping the jacket from the optical fiber cable to electrically connect the exposed metal wires because electrical connection of metal wires has not been considered. Therefore, in recent years there has been demand for an optical fiber cable splicing box that can easily connect optical fiber cables without the need for special techniques or tools and that can easily electrically connect a pair of metal wires.

Therefore, an aspect of the present invention is to provide an optical fiber cable splicing box that can easily connect together optical fiber cables that include a metal wire and an optical fiber.

SUMMARY

The present invention is an optical fiber cable splicing box that matches and connects together in a predetermined direction ends of a pair of optical fiber cables having a metal wire and an optical fiber. The optical fiber slicing box includes a pair of cable holders provided aligned in the predetermined direction that respectively grip jackets of a pair of the optical fiber cables; a body where a pair of the cable holders are fixed; an optical connector fixed to the body that optically connects together ends of the optical fiber in a pair of the optical fiber cables; a pair of contact portions having conductivity provided respectively on a pair of the cable holders or near a pair of the cable holders; and a bridge portion having conductivity that extends in the predetermined direction. The contact portion includes a first connection portion that is electrically connected to the metal wire of the optical fiber cable by penetrating into the cable jacket, and a second connection portion that is electrically connected to the bridge portion while electrically conducting with the first connection portion.

This optical fiber cable splicing box is provided with a pair of contact portions that can secure an electrical connection between metal wires without stripping the respective jackets on a pair of optical fiber cables. In addition, these contact portions have a second connection portion that is electrically connected to the bridge portion. Therefore, in a pair of optical fiber cables, optical fibers can be optically connected by an optical connection portion and metal wires can be electrically connected through the contact portion and the bridge portion. Accordingly, an electrical connection can be easily secured at the time of connecting optical fiber cables.

Further, the contact portion is preferably provided on the cable holder so that the second connection portion is exposed from the cable holder, and the bridge portion is preferably electrically connected to the second connection portion exposed from the cable holder in a state where the cable holder is fixed to the body. In this case, fixing the cable holder to the body allows the metal wires from the pair of optical fiber cables to be electrically connected.

In addition, the optical fiber cable preferably includes a first metal wire and a second metal wire as the metal wire, and the contact portion is preferably at least one of a first contact portion electrically connected to the first metal wire and a second contact portion electrically connected to the second metal wire. In this case, the two metal wires can be electrically connected between the pair of optical fiber cables.

Further, the first connection portion in the first contact portion preferably sandwiches the first metal wire in a state where a gap is provided with the second metal wire so as to be electrically connected with only the first metal wire, and the first connection portion in the second contact portion preferably sandwiches the second metal wire in a state where a gap is provided with a first metal wire so as to be electrically connected to only the second metal wire. In this case, sandwiching the first metal wire with the first contact portion allows the first metal wire to be electrically conductive with the first contact portion alone, and sandwiching the second metal wire with the second contact portion allows the second metal wire to be electrically conductive with the second contact portion alone.

In addition, the first contact portion and the second contact portion are preferably integrally formed. In this case, the contact portions can be electrically connected to the first and second metal wires by a single operation. Further, the first and second metal wires can be connected to the same ground potential.

Further, the first contact portion and the second contact portion are preferably formed separately, and the bridge portion preferably has a first bridge portion electrically connected to only the first contact portion and a second bridge portion electrically connected to only the second contact portion. In this case, the first and second metal wires can both be connected to different ground potentials.

Further, an example of a configuration to favorably achieve the effect given above includes, specifically, an example where the contact portion and the bridge portion are integrally formed.

Effect of the Invention

According to the present invention, optical fiber cables that include a metal wire and an optical fiber can be easily connected together.

DETAILED DESCRIPTION

Figure 1:
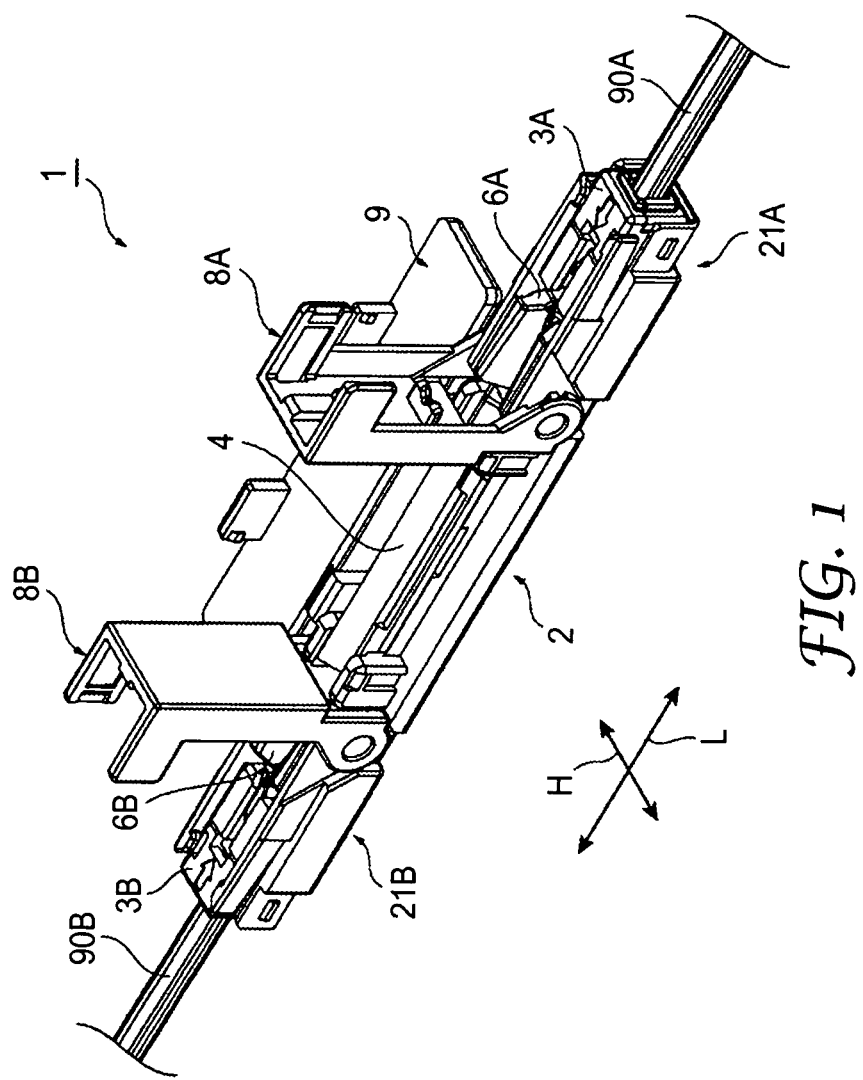
FIG. 1 is a perspective view illustrating an optical fiber cable splicing box according to a first embodiment.

Embodiments according to an optical fiber cable splicing box of the present invention will be described in detail with reference to the attached drawings. In the description given below, like reference numerals designate identical or similar elements and overlapping descriptions will be omitted. Further, the terms "inner" and "outer" refer respectively to the inner side and the outer side of the optical fiber cable splicing box.

First Embodiment

Figure 2:
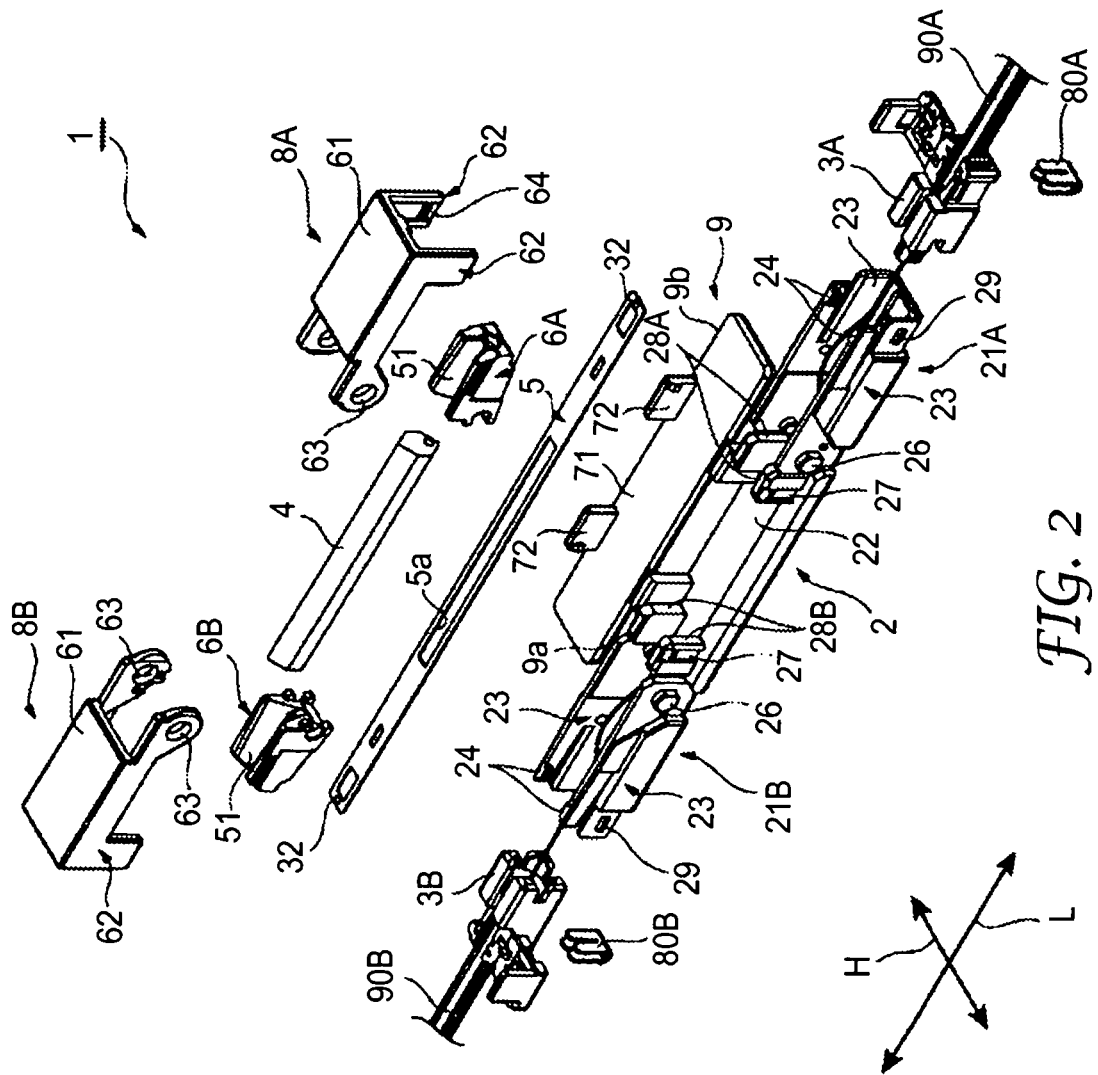
FIG. 2 is an exploded perspective view illustrating the optical fiber cable splicing box according to the first embodiment.
Figure 3:
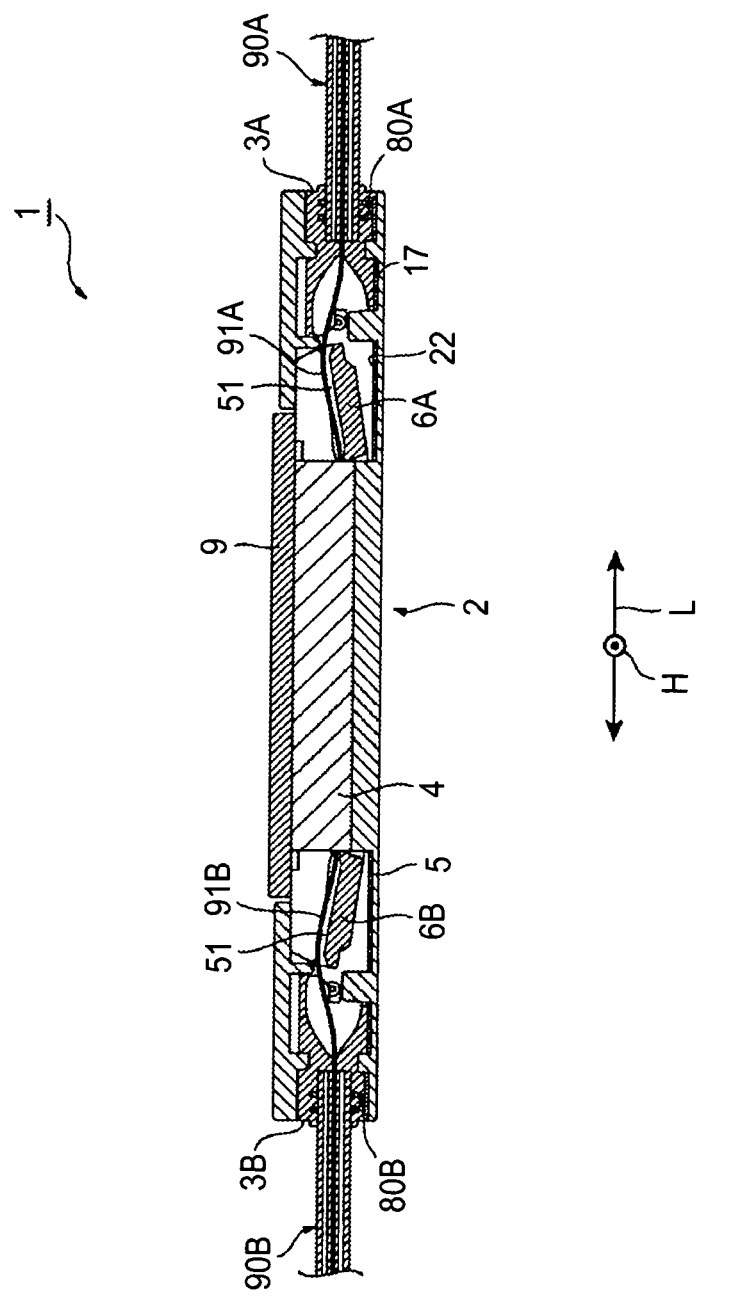
FIG. 3 is a perspective view illustrating the optical fiber cable splicing box according to the first embodiment.

Initially, a first embodiment will be described. As illustrated in FIG. 1 through FIG. 3, an optical fiber cable splicing box 1 is used to pull an aerial wiring system optical fiber cable to each user in, for example, an FTTH network. Here, the optical fiber cable splicing box 1 is matched to connect together an optical fiber cable with a different optical fiber cable within an aerial wiring system in a predetermined direction (predetermined direction) L.

This optical fiber cable splicing box 1 is provided with a body 2, a pair of cable holders 3A and 3B, a mechanical splice 4, and a metal plate 5. In addition, the optical fiber cable splicing box 1 is further provided with a pair of fiber lifters 6A and 6B, a pair of side covers 8A and 8B, and a center lever 9.

Figure 4:
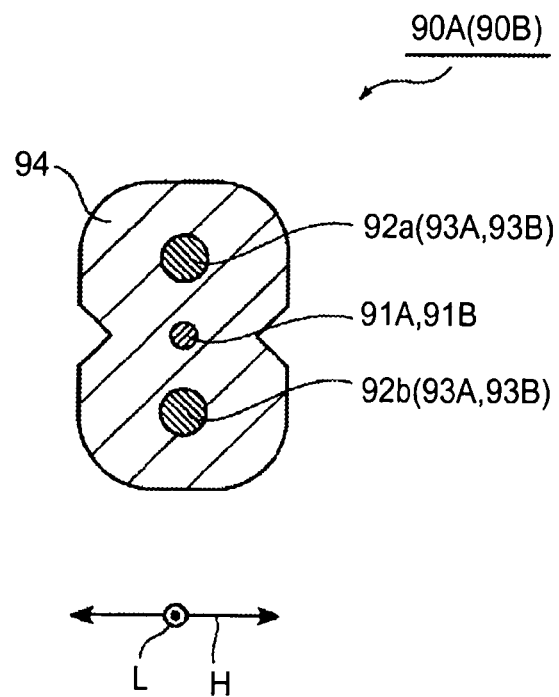
FIG. 4 is a cross-sectional view illustrating a structure of an optical fiber cable.

A description will be provided first of the optical fiber cables 90A and 90B. As illustrated in FIG. 4, the optical fiber cables 90A and 90B are so-called optical drop cables that have, respectively, optical fibers 91A and 91B, a wire pair 93A and 93B that include first and second metal wires 92a and 92b that are tension members, and a jacket 94 that covers the optical fibers 91A and 91B as well as the wire pair 93A and 93B.

The first and second metal wires 92a and 92b are network wires having a diameter of, for example, 0.5 mm to 2 mm.

The first and second metal wires 92a and 92b are arranged to be mutually parallel. The optical fibers 91A and 91B have a configuration where an optical fiber core wire made up of a core and a clad is protected by a covering layer of, for example, 0.25 mm in diameter. These optical fibers 91A and 91B are disposed between the first metal wire 92a and the second metal wire 92b.

The jacket 94 is configured of, for example, flame resistant polyethylene. The jacket 94 of the optical fiber cable 90A is formed so as to cover the optical fiber 91A and the wire pair 93A. The jacket 94 of the optical fiber cable 90B is formed so as to cover the optical fiber 91B and the wire pair 93B. The cross-sectional outer shape of the jacket 94 is configured in a substantially rectangular shape such that the alignment direction of the first and second metal wires 92a and 92b is in the length direction.

Figure 5:
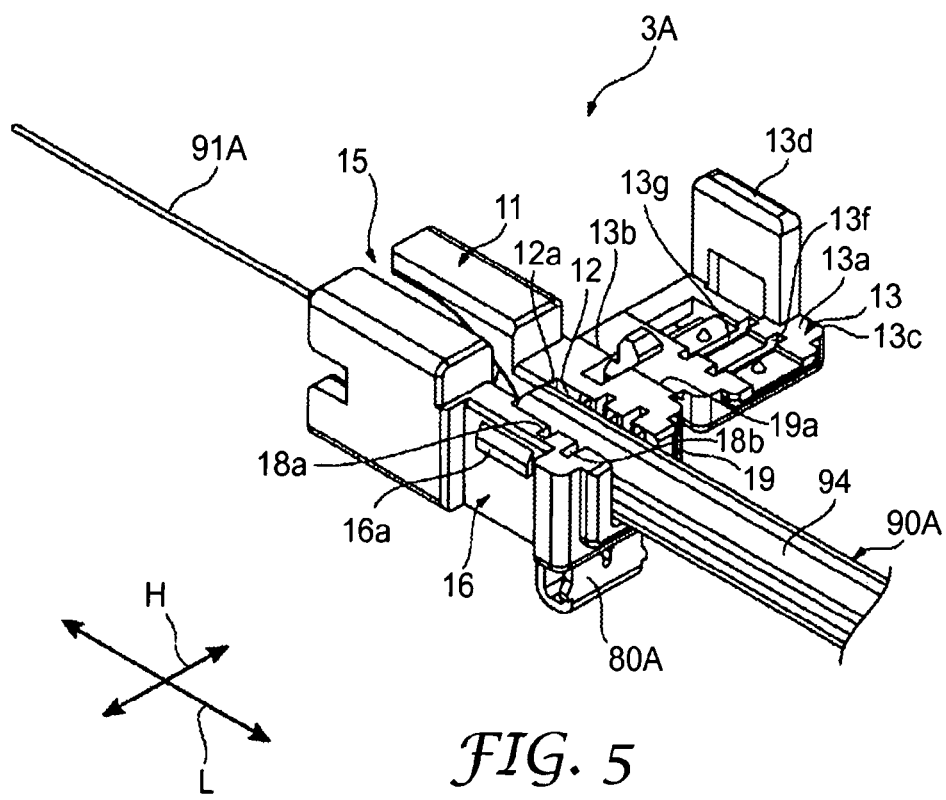
FIG. 5 is a perspective view illustrating a structure of a cable holder.

As illustrated in FIG. 5, a cable holder 3A holds the optical fiber cable 90A. The cable holder 3A grips the jacket 94 of the optical fiber cable 90A and places the optical fiber cable 90A in a predetermined position on the body 2 (see FIG. 1). The cable holder 3A has a main body portion 11 that has a substantially rectangular parallelepiped shape and a cover 13 provided with the ability to open and close on the main body portion 11.

The main body portion 11 is provided with a gripping portion 12 having, for example, a saw blade like shape, for gripping the jacket 94 of the optical fiber cable 90A and an insertion portion 15 where the optical fiber 91A of the optical fiber cable 90A is inserted. The gripping portion 12 and the insertion portion 15 are formed so as to form a groove shape that extends in the predetermined direction L in the main body portion 11 and continue together from the outer side of the predetermined direction L to the inner side in that order.

The gripping portion 12 opens to the outer side in the predetermined direction L on the main body portion 11. This gripping portion 12 has a groove width that corresponds to the outer shape of the jacket 94. The insertion portion 15 opens to the inner side of the predetermined direction L in the main body portion 11. This insertion portion 15 has a groove width that is smaller than the groove width of the gripping portion 12.

In addition, the main body portion 11 is provided with grooves 18a and 18b where a contact portion 80A to be described hereinafter is inserted. The grooves 18a and 18b are formed in a direction orthogonal to the predetermined direction L and extend in a width direction H that corresponds to the width of the optical fiber cable splicing box 1 (hereinafter referred to as simply "width direction H"). Further, a protruding portion 16a that engages with the cover 13 is provided on a side wall portion 16 that configures the side surface of the main body portion 11. This side wall portion 16 is linked to an edge portion 19a of a side wall portion 19 of the opposite side by the cover 13.

The cover 13 has a lid portion 13a that covers the gripping portion 12, the optical fiber cable 90A gripped by the gripping portion 12, and the grooves 18a and 18b. One edge portion 13b of the lid portion 13a is connected so as to pivot freely on the edge portion 19a of the main body portion 11. Meanwhile, another edge portion 13c on the opposite side of the one edge portion 13b is provided with a fixing portion 13d so as to extend in a direction that is orthogonal to the lid portion 13a. Grooves 13f and 13g that communicate to the grooves 18a and 18b when the cover 13 is closed are provided on the lid portion 13a. This type of cover 13 is fixed while having the ability to open and close relative to the main body portion 11, by engaging the fixed portion 13d of the cover 13 with the protruding portion 16a of the main body portion 11.

The cable holder 3A is provided with the contact portion 80A that has conductivity. The contact portion 80A penetrates into the jacket 94 of the optical fiber cable 90A and has first connection portions 84c and 85c that are electrically connected to the metal wires 92a and 92b of the optical fiber cable 90A (see FIG. 8). Further, the contact portion 80A has a base portion 83 as a second connection portion that conducts relative to the first connection portions 84c and 85c. This base portion 83 is exposed from the cable holder 3A and is electrically connected to the metal plate 5. A detailed description of the contact portion 80A will be given below.

The cable holder 3A configured in this manner is fixed at both ends of the body 2 so as to be set in parallel in the predetermined direction L (see FIG. 1 and FIG. 3). Note that the cable holder 3B has a similar configuration to the cable holder 3A, and therefore, a description thereof is omitted here.

As illustrated in FIG. 1 through FIG. 3, the body 2 is a member that extends in the predetermined direction L and has a gap that allows various components to be disposed therein. A holder retaining section 21A where the cable holder 3A is contained and fixed is provided on one end side in the predetermined direction L on the body 2. Meanwhile, a holder retaining section 21B where the cable holder 3B is contained and fixed is provided on the other end side in the predetermined direction L on the body 2.

The holder retaining sections 21A and 21B are configured to include a flat plate shaped bottom portion 22 on the body 2 and a pair of side wall portions 23 that are installed facing one another at both end parts of the bottom portion 22 in the width direction H. Hooks 24 are respectively provided, on outside end portions in the predetermined direction L, on the inner surface of each side wall portion 23. The pair of hooks 24 engage with the main body portion 11 of the cable holders 3A and 3B and fix the cable holders 3A and 3B to the body 2. These hooks 24 are arranged facing one another. In addition, a projection portion 22a is provided on both end portions in the predetermined direction L on the bottom portion 22 so as to fix the metal plate 5 (see FIG. 6).

The mechanical splice 4 optically connects the end portions of the optical fibers 91A and 91B. In other words, the mechanical splice 4 is an optical connection portion that optically connects together the end surface of the optical fiber 91A of the optical fiber cable 90A and the end surface of the optical fiber 91B of the optical fiber cable 90B. This type of mechanical splice 4 is arranged in the center of the width direction H within the body 2 and is sandwiched by a pair of standing pieces 28A and 28B installed on the bottom portion 22 of the body 2.

Here, the mechanical splice 4 optically connects the optical fiber cable 90A to the optical fiber cable 90B by mechanically fixing the optical fibers 91A and 91B in a state in which the end surface of the one optical fiber 91A is matched to the end surface of the other optical fiber 91B. Note that the optical connection portion is not limited to this configuration, and, for example, the optical fibers 91A and 91B maybe optically connected by fusing together.

Figure 6:
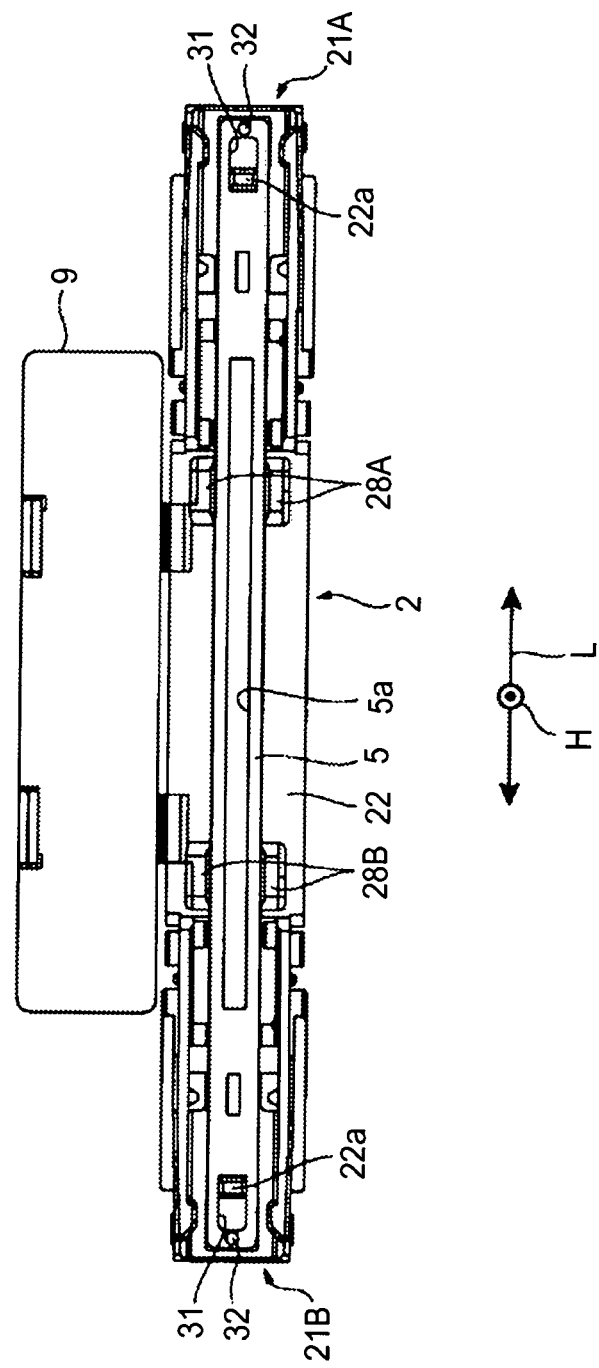
FIG. 6 is a plan view illustrating a body and a metal plate.

As illustrated in FIG. 6, the metal plate 5 is a bridge part having conductivity and has a rectangular plate shape that extends in the predetermined direction L. The metal plate 5 electrically connects together the contact portion 80A provided on the cable holder 3A and the contact portion 80B provided on the cable holder 3B (see FIG. 3).

A hole portion 5a having a rectangular shape is provided in the center portion in the predetermined direction L of the metal plate 5. Further, hole portions 31 are provided respectively on both end portions in the predetermined direction L of the metal plate 5, and when the projection 22a of the body 2 engages with the hole portion 31, the metal plate 5 is fixed to the bottom portion 22 of the body 2. A connection portion 32 that is, for example, a raised portion that extends in a spherical shape, is provided in neighboring positions on the outer side of the hole portion 31 on the metal plate 5 as a portion for the contact portions 80A and 80B, explained hereinafter, to contact. The shape of the other connection portion 32 may be a protruding shape in which a portion of the metal plate 5 in a position that corresponds to the connection portion 32 is bent.

Note that, as will be described in detail below, the metal plate 5 and the body 2 may be provided with a configuration for grounding the metal wires 92a and 92b of the optical fiber cable 90A and/or the metal wires 92a and 92b of the optical fiber cable 90B. In other words, a configuration may be provided, for example, to electrically connect together the metal wires 92a and 92b of the optical fiber cables 90A and 90B, and to ground both the metal wires 92a and 92b of the optical fiber cables 90A and 90B. Furthermore, when connecting an optical fiber cable (not illustrated) that does not have metal wires 92a and 92b to the optical fiber cable 90A, a configuration may be provided in which only the metal wires 92a and 92b of the optical fiber cable 90A are grounded.

An example of a configuration of the metal plate 5 and the body 2 in order to ground the metal wires 92a and 92b includes a configuration where a connection terminal for a ground wire, in which a ground wire is electrically connected to the metal plate 5, is disposed on an outside portion of the body 2. A further example includes a configuration in which the ground wire is inserted into the body 2 after passing through an opening portion provided in the body 2, and the connection terminal for a ground wire, in which the ground wire is connected to the metal plate 5, is disposed in an inside portion of the body 2.

As illustrated in FIGS. 2 and 3, the fiber lifter 6A generates a predetermined flexure in the optical fiber 91A that extends between the cable holder 3A and the mechanical splice 4. Further, the fiber lifter 6B generates a predetermined flexure in the optical fiber 91B that extends between the cable holder 3B and the mechanical splice 4. These fiber lifters 6A and 6B are provided with a groove 51 having a cross-section in the shape of a V that extends in and the predetermined direction L.

This type of fiber lifter 6A and 6B is provided between the mechanical splice 4 and the cable holder 3A, and the mechanical splice 4 and the cable holder 3B, respectively.

As illustrated in FIG. 1 through FIG. 3, a pair of side covers 8A and 8B are members having a lid portion 61 in a flat plate like shape and side wall portions 62 provided on both end portions in the width direction H of the lid portion 61. A hole portion 63 that is a circular through hole is provided on the inner side in the predetermined direction L of the side wall portion 62. In addition, an engagement piece 64 is provided on the inner side in the width direction H of the side wall portion 62. The engagement piece 64 fixes the side covers 8A and 8B to the body 2 by engaging with the raised portion 29 provided on the body 2.

This type of side cover 8A and 8B is disposed on both end portions of the body 2 so that the lid portion 61 covers the cable holders 3A and 3B and the fiber lifters 6A and 6B. In addition, the hole portion 63 is fit to freely pivot with a columnar shaped raised portion 26 that is provided to protrude to the outer side in the width direction H at the side wall portion 23 of the body 2. By this, the side covers 8A and 8B are connected to the body 2 with the ability to open and close.

A center lever 9 has a lid portion 71 and a fixing portion 72. The center lever 9 is provided substantially in the center of the body 2 so as to cover the mechanical splice 4 fixed to the body 2. In other words, the center lever 9 is provided between the pair of side covers 8A and 8B which are disposed on both ends of the body 2. One edge portion 9a of the center lever 9 in the width direction H is connected to the side wall portion 23 of the body 2 to freely rotate. Further, the fixing portion 72 is installed on a second edge portion 9b in the width direction H. The fixing portion 72 fixes the center lever 9 to the body 2 by engaging with a recessed portion 27 provided on the body 2. In this manner, the center lever 9 is connected to the body 2 with the ability to open and close. Note that the center lever 9 may be a different member from the body 2 or it may be integrally formed with the body 2.

Next, a detailed description of a cable holder and a contact portion will be given using the contact portion 80A disposed on the cable holder 3A as an example. Note that the cable holder 3B and the contact portion 80B (see FIG. 2) have a similar configuration to the cable holder 3A and the contact portion 80A, and therefore, explanations thereof will be omitted here.

Figure 7:
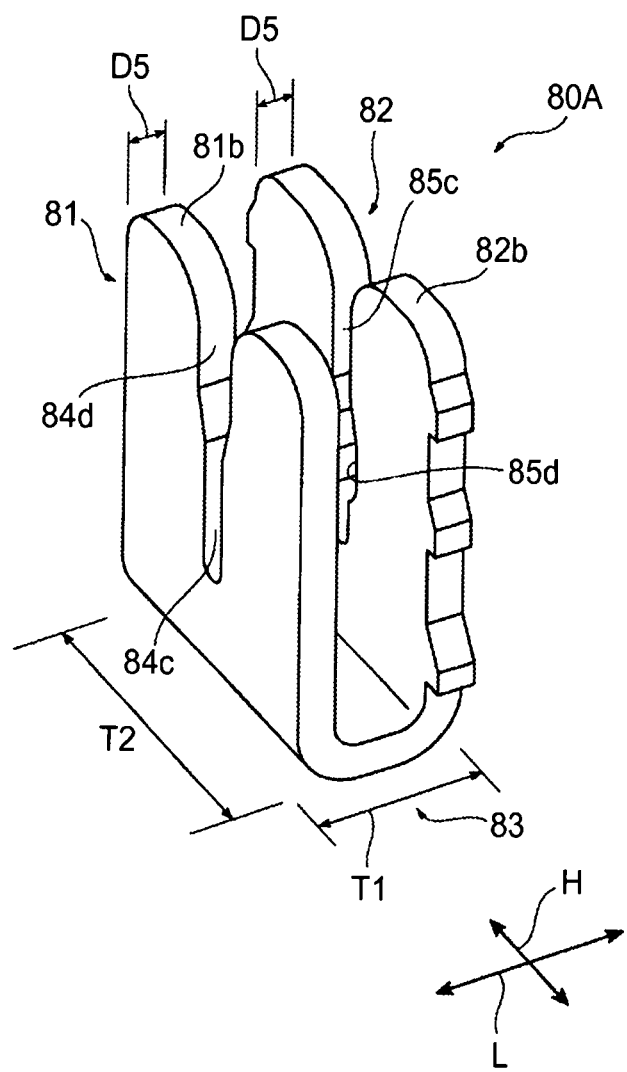
FIG. 7 is a perspective view illustrating a structure of a contact portion.
Figure 8A:
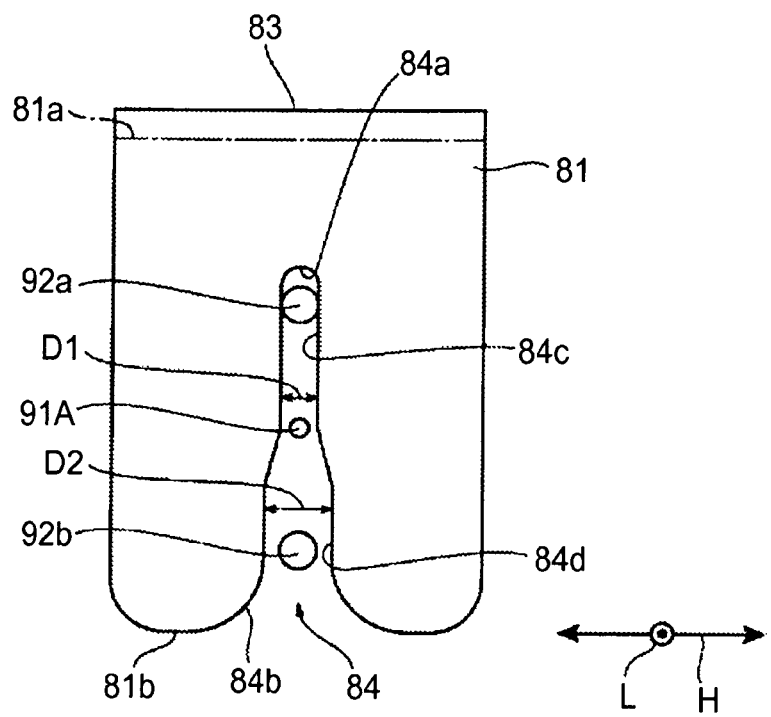
FIG. 8A is an end view illustrating a first contact portion.
Figure 8B:
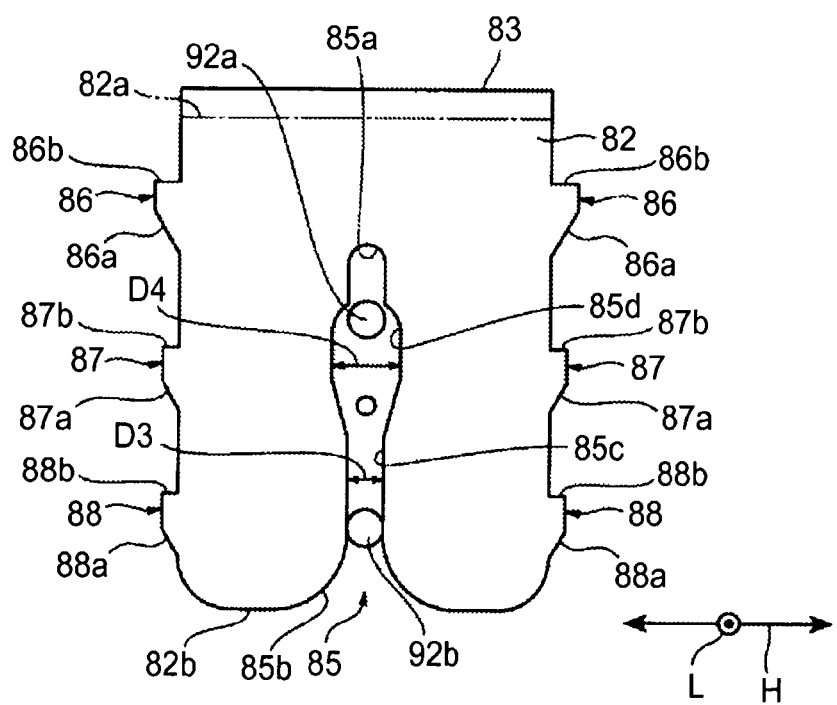
FIG. 8B is an end view a second contact portion.
Figure 9:
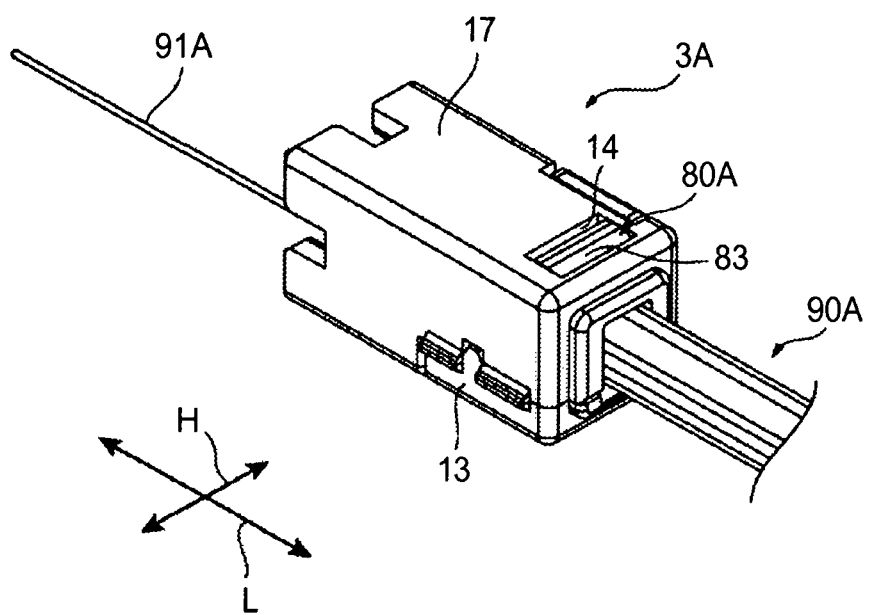
FIG. 9 is a perspective view illustrating a cable holder and a contact portion.

As illustrated in FIG. 7 through FIG. 9, the contact portion 80A is a plate shaped member bent in a U shape as viewed from the width direction H and has first and second contact portions 81 and 82 as well as the base portion 83 that extends between the first and second contact portions 81 and 82. The contact portion 80A has a similar degree of rigidity as the first and second metal wires 92a and 92b or a lower rigidity than the first and second metal wires 92a and 92b and is configured of a material having conductivity (for example, a metal material such as iron, aluminum, copper, or the like).

Here, the metal wire electrically connected to the first contact portion 81 is the first metal wire 92a, and the metal wire electrically connected to the second contact portion 82 is the second metal wire 92b. Note that differentiation between the first and the second of the metal wires included in the optical fiber cable 90A is not limited, and for example, may be defined by an absolute positional relationship relative to the body 2 or the like, or may be defined by a relationship between the metal wire and the contacting contact portion.

As illustrated in FIG. 8A, the first contact portion 81 which is a thin plate like member has a U shape when viewed from the predetermined direction L and has a groove 84 that extends in a direction orthogonal to the base portion 83 (a vertical direction in the illustrated diagram). The groove 84 includes a bottom portion 84a provided on an end portion 81a side and an opening 84b that opens to an end portion 81b. In addition, a first connection portion 84c that includes the bottom portion 84a, and a wide portion 84d that includes the opening 84b, is provided in the groove 84.

The first connection portion 84c sandwiches the first metal wire 92a of the optical fiber cable 90A in the width direction H. The first connection portion 84c is formed in a substantially center part of the first contact portion 81 and is connected to the wide portion 84d. A width D1 of the first connection portion 84c is configured to be substantially the same or slightly smaller than the diameter of the first metal wire 92a. Setting the dimension of the width D1 in this manner enables the first metal wire 92a to be securely sandwiched in the first connection portion 84c, and thus, the first connection portion 84c is electrically connected to the first metal wire 92a.

The wide portion 84d is formed so as to extend from the first connection portion 84c to the end portion 81b side. The second metal wire 92b of the optical fiber cable 90A is disposed within the wide portion 84d. A width D2 of the wide portion 84d is larger than the diameter of the second metal wire 92b and is wider than the width D1 of the first connection portion 84c, and in this manner, the wide portion 84d is configured to not contact with the metal wire 92b. Accordingly, only the first metal wire 92a is electrically connected to the first contact portion 81.

As illustrated in FIG. 8B, the second contact portion 82 which is a thin plate like member has a U shape when viewed from the predetermined direction L and has a groove 85 that extends in a direction orthogonal to the base portion 83 (a vertical direction in the illustrated diagram). The groove 85 includes a bottom portion 85a provided on the end portion 82a side and an opening 85b that opens to the end portion 82b. In addition, a first connection portion 85c that includes the opening 85b, and a wide portion 85d, are provided in the groove 85.

The first connection portion 85c sandwiches the second metal wire 92b of the optical fiber cable 90B in the width direction H. This first connection portion 85c is formed so as to extend from a substantial center part of the second contact portion 82 to the end portion 82b. A width D3 of the first connection portion 85c is configured to be substantially the same or slightly smaller than the diameter of the second metal wire 92b. Setting the size of the width D3 in this manner enables the second metal wire 92b to be securely sandwiched in the first connection portion 85c, and thus, the first connection portion 85c is electrically connected to the second metal wire 92b.

The wide portion 85d is formed in a substantially center part of the second contact portion 82 and is connected to the first contact portion 85c. The first metal wire 92a of the optical fiber cable 90A is disposed within the wide portion 85d. A width D4 of the wide portion 85d is larger than the diameter of the first metal wire 92a and is wider than the width D3 of the first connection portion 85c, and by this, the wide portion 85d is configured to not contact with the first metal wire 92a. Accordingly, only the second metal wire 92b is electrically connected to the second contact portion 82.

This second contact portion 82 includes raised portions 86, 87, and 88. The raised portions 86, 87, and 88 are formed so as to protrude in the width direction H from the side surface of the second contact portion 82. The raised portion 86 is provided on the base portion 83 side on the side surface, and the raised portion 88 is provided on the end portion 82b side on the side surface. The raised portion 87 is provided between the raised portion 86 and the raised portion 88 on the side surface.

These raised portions 86, 87, and 88 have a saw tooth shape where the end portion 82b side is slanted. Specifically, the raised portions 86, 87, and 88 include slanted surfaces 86a, 87a, and 88a that slant to the inner side (approaching the inner side) in accordance with progression from the end portion 82a to the end portion 82b. Further, the raised portions 86, 87, and 88 include orthogonal surfaces 86b, 87b, and 88b that are substantially orthogonal to the side surface.

The protruding height from the side surface is substantially similar for both the raised portion 87 and the raised portion 88. Meanwhile, the protruding height of the raised portion 86 is configured to be higher than that of the raised portion 87 or the raised portion 88. Providing a configuration formed in this manner allows the contact portion 80A to be easily inserted into the cable holder 3A while also preventing the contact portion 80A from falling out from the cable holder 3A.

The base portion 83 separates and mutually connects the first and second contact portions 81 and 82 in the predetermined direction L and allows these first and second contact portions 81 and 82 to conduct. In other words, the first connection portion 84c in the first contact portion 81 and the first connection portion 85c in the second contact portion 82 are allowed to mutually conduct by the base portion 83. This base portion 83 contacts the metal plate 5 provided on the body 2 and configures the second connection portion.

A thickness D5 of the first and second contact portions 81 and 82 in the contact portion 80A penetrates the jacket 94 of the optical fiber cable 90A and contacts the first metal wire 92a and the second metal wire 92b. Therefore, the thickness may be set to a desired thickness as long as the thickness is capable of cutting through the jacket 94. For example, the thickness D5 of the first contact portion 81 and the second contact portion 82 is approximately between 0.3 to 0.7 mm, but that range may be thinner or thicker depending on the material used to configure the contact portion 80A. Any thickness D5 of the first and second contact portions 81 and 82 may be selected within a range of for example, not less than 0.2 mm, not less than 0.3 mm, or not less than 0.4 mm and not more than 0.6 mm, not more than 0.8 mm, or not more than 1 mm. According to the first and second contact portions 81 and 82 having this type of thickness D5, the contact portion 80A can favorably penetrate the jacket 94 of the optical fiber cable 90A. As a result, breakage of the optical fiber 91A due to deformation of the optical fiber cable 90A can be prevented when inserting the contact portion 80A into the cable holder 3A.

Furthermore, the thickness D5 of the first and second contact portions 81 and 82 is not required to be uniform. For example, the first and second contact portions 84c and 85c may have a sharp shape that tapers as it approaches the first and second metal wires 92a and 92b. With this type of configuration, rigidity is secured with a wide thickness of the first and second contact portions 81 and 82 while the contact portion 80A can be made to favorably penetrate into the jacket 94 because the first and second contact portions 84c and 85c are sharp.

As illustrated in FIG. 9, an insertion portion 14 that communicates with the grooves 18a and 18b is provided on a bottom portion 17 of the cable holder 3A that faces the bottom portion 22 of the body 2, as an instrument for inserting the contact portion 80A. Further, the first contact portion 81 is inserted into the groove 18a via the insertion portion 14, and the second contact portion 82 is inserted into the groove 18b via the insertion portion 14. In this manner, the contact portion 80A is attached to the cable holder 3A. In addition, an engagement portion not illustrated is provided on side surfaces of the groove 18b facing in the width direction H as a raised portion that engages the raised portions 86, 87, and 88 provided on the second contact portion 82.

Next, a description will be given of steps for connecting the optical fiber cables 90A and 90B together using the optical fiber cable splicing box 1.

First Step

Figure 10A:
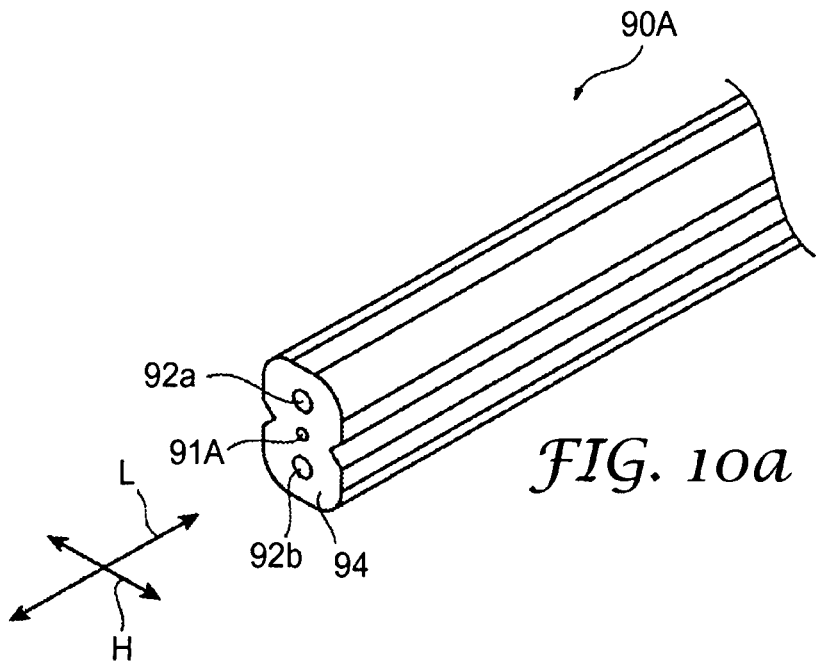
FIGS. 10a and 10b are two diagrams of an optical fiber cable for explaining the connection process of an optical fiber cable in the optical fiber cable splicing box according to the first embodiment.
Figure 10B:
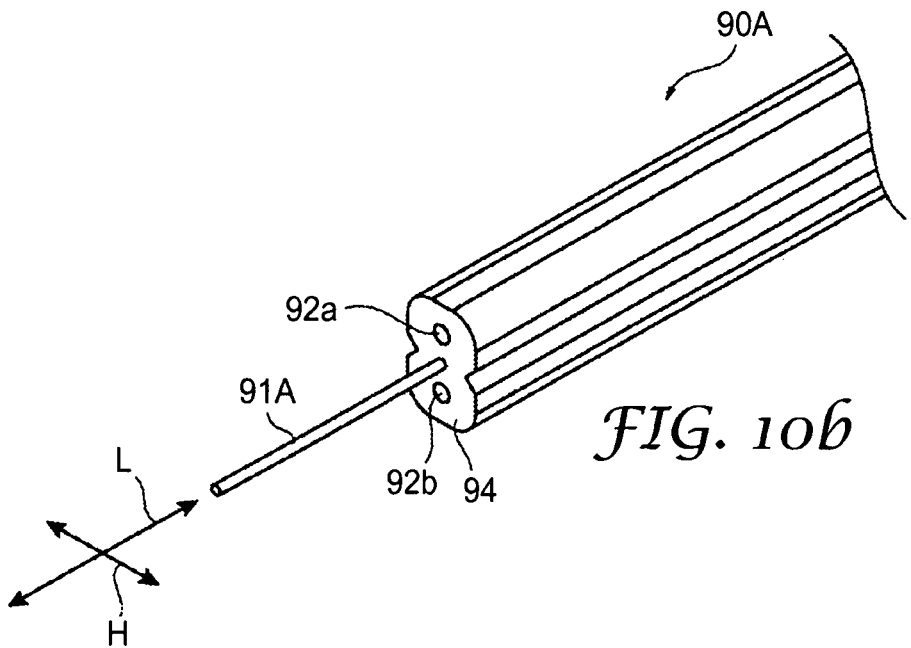

First, an optical fiber cable 90A such as that illustrated in FIG. 10A is prepared. Next, as illustrated in FIG. 10B, the jacket 94 of the optical fiber cable 90A is removed to expose the optical fiber 91A of the optical fiber cable 90A. A known jacket removing tool may be used to remove the jacket 94.

Figure 11:
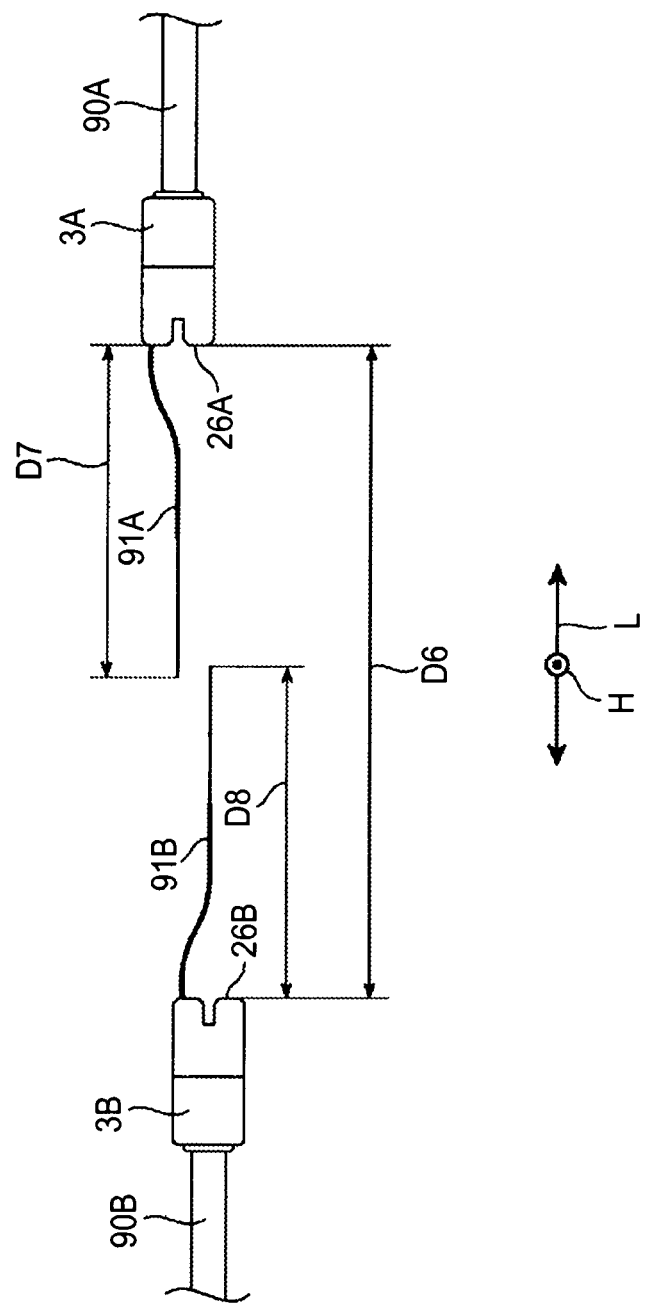
FIG. 11 is an end view illustrating a relationship between optical fibers.

Note that, as illustrated in FIG. 11, the length of the optical fibers 91A and 91B are set so that a total length of a length D8 of the optical fiber 91B that protrudes from an end surface 26B of the cable holder 3B plus a length D7 of the optical fiber 91A that protrudes from an end surface 26A of the cable holder 3A is longer than a length D6 from the end surface 26A to the end surface 26B. Setting in this manner allows a predetermined flexure to be generated between the mechanical splice 4 and the cable holders 3A and 3B, and as result, the end surface of the optical fiber 91A and the end surface of the optical fiber 91B can be matched (see FIG. 3).

Second Step

Next, while inserting the optical fiber 91A into the insertion portion 15, the jacket 94 is pushed into the gripping portion 12 to place the optical fiber cable 90A within the cable holder 3A (see FIG. 5). Afterwards, the cover 13 is closed and the fixing portion 13d of the cover 13 is engaged with the protruding portion 16a of the main body portion 11.

Figure 12:
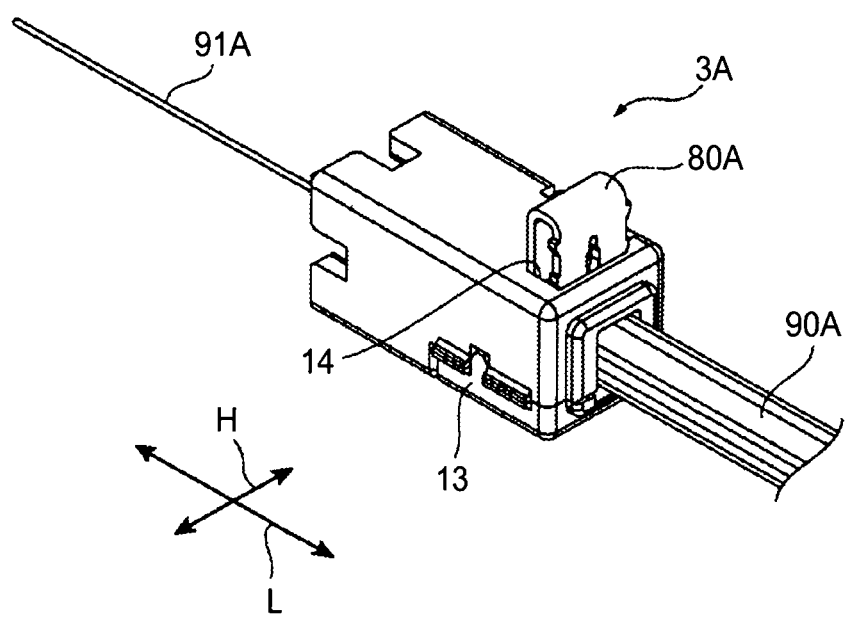
FIG. 12 is a diagram for explaining the next process of the process illustrated in FIG. 10.
Figure 13:
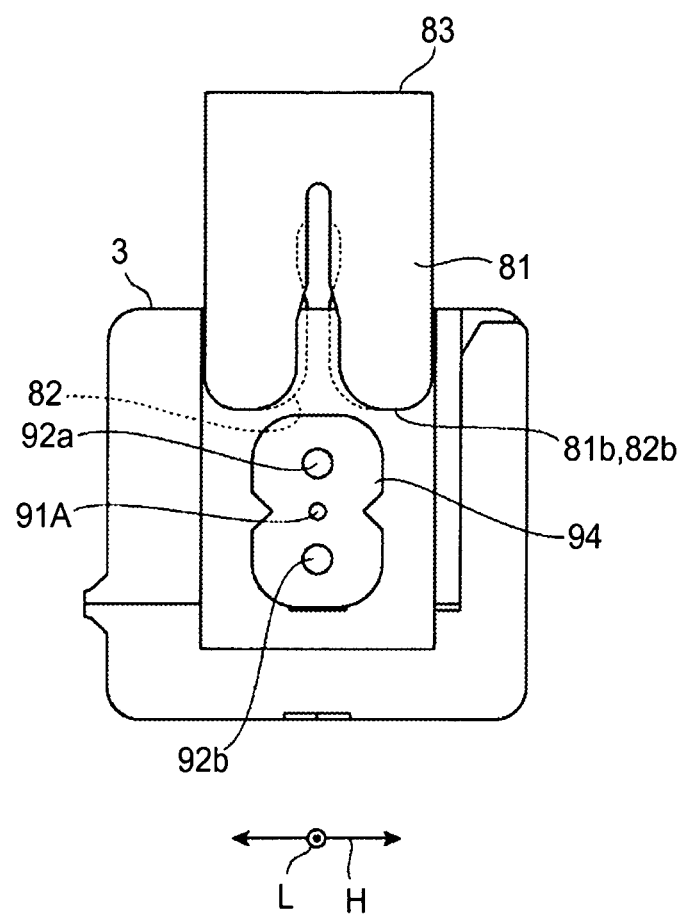
FIG. 13 is an end view illustrating a relationship between a contact portion and an optical fiber cable.

Note that, as illustrated in FIG. 12, the contact portion 80A may be attached in advance to the cable holder 3A or it may be attached in the following third step. When the contact portion 80A is attached in advance, the raised portion 88 of the contact portion 80A that is inserted from the insertion portion 14 engages with the engagement portion of the groove 18b and is provisionally fixed to the cable holder 3A to the extent that the contact portion 80A does not fall out from the groove 18b. As illustrated in FIG. 13, while the contact portion 80A is provisionally fixed to the cable holder 3A, the end portion 81b of the first contact portion 81 and the end portion 82b of the second contact portion 82 do not contact the jacket 94.

Third Step

Figure 14:
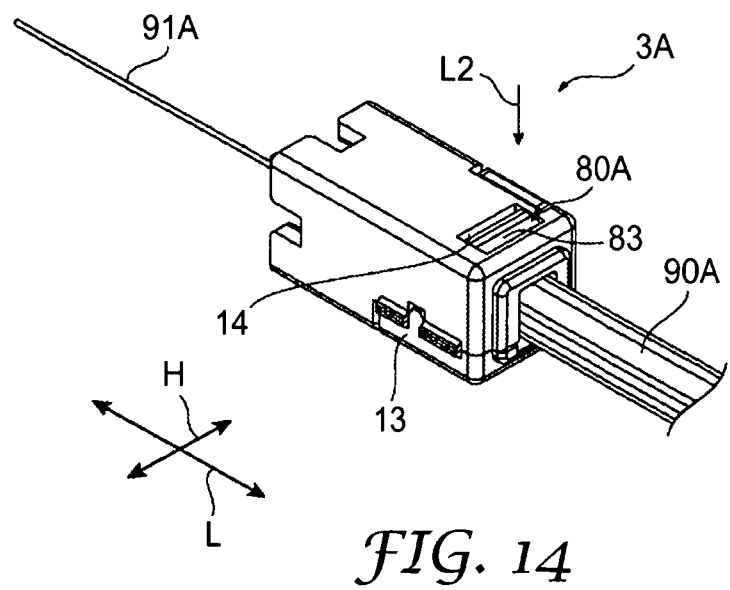
FIG. 14 is a diagram for explaining the next process of the process illustrated in FIG. 12.
Figure 15:
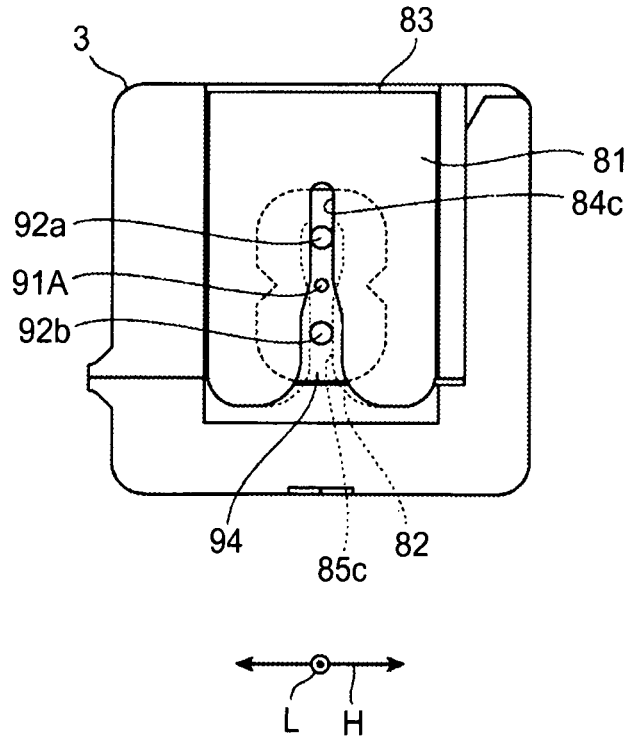
FIG. 15 is another end view illustrating a relationship between a contact portion and an optical fiber cable.

Next, as illustrated in FIG. 14, the contact portion 80A is pushed in a direction L2 that is orthogonal to the direction where the optical fiber cable 90A is extended, and the contact portion 80A is pushed into the cable holder 3A and fixed. As illustrated in FIG. 15, with the contact portion 80A pushed into the cable holder 3A, the first contact portion 81 penetrates into the jacket 94 and the first connection portion 84c contacts the first metal wire 92a, and the second contact portion 82 penetrates into the jacket 94 and the first connection portion 85c contacts the second metal wire 92b.

As a result, the base portion 83 is exposed from the cable holder 3A while the first contact portion 81 mutually conducts with the first metal wire 92a and the second contact portion 82 mutually conducts with the second metal wire 92b. The contact portion 80A in this fixed state has the raised portion 86 thereof locked in the engagement portion of the groove 18b, and by this, the contact portion 80A is suppressed from falling out from the cable holder 3A.

Note that the contact portion 80A may be directly pressed by the hand of the worker or maybe pressed by using a predetermined jig. Because the contact portion 80A can be precisely pressed in the direction L2 when a jig is used, the contact portion 80A can be made to favorably penetrate the jacket 94 of the optical fiber cable 90A.

Fourth Step

Figure 16:
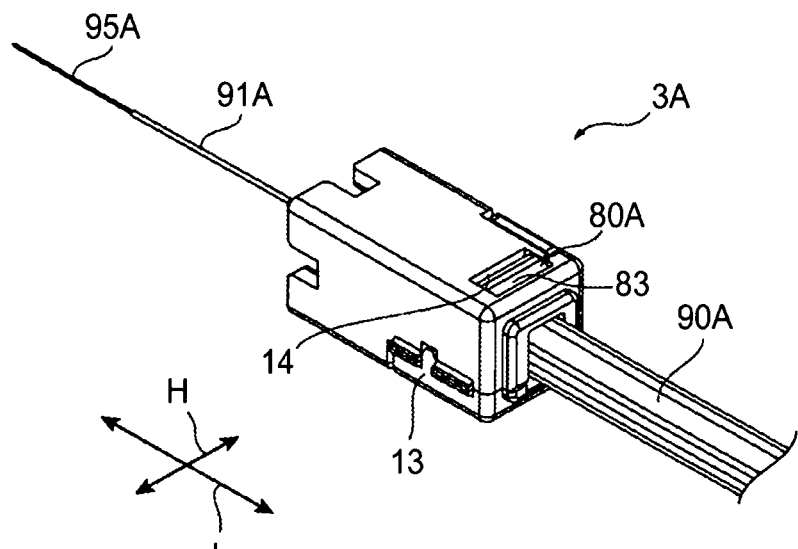
FIG. 16 is a diagram for explaining the next process of the process illustrated in FIG. 14.

Next, as illustrated in FIG. 16, a covering layer of the optical fiber 91A is stripped to expose the core wire 95A made of a core and a clad.

Fifth Step

Next, the cable holder 3A is inserted in the predetermined direction L into the holder retaining section 21A of the body 2. At this time, the cable holder 3A is set so that the base portion 83 of the contact portion 80A is oriented to face the bottom portion 22 of the body 2. When inserting the cable holder 3A up to a predetermined position of the holder retaining section 21A on the body 2, the hook 24 of the holder retaining section 21A engages with the main body portion 11 of the cable holder 3A, and thus the cable holder 3A is fixed to the body 2. In this manner, the base portion 83 of the contact portion 80A contacts the connection portion 32 of the metal plate 5. As a result, the first metal wire 92a and the second metal wire 92b of the optical fiber cable 90A conduct with the metal plate 5 via the contact portion 80A (see FIG. 3).

By way of the first through fifth steps given above, the optical fiber cable 90A is set in the optical fiber cable splicing box 1. A separate optical fiber cable 90B can be connected to the optical fiber cable 90A by implementing similar steps to the first through fifth steps given above either consecutively or simultaneously in parallel.

Sixth Step

Figure 17:
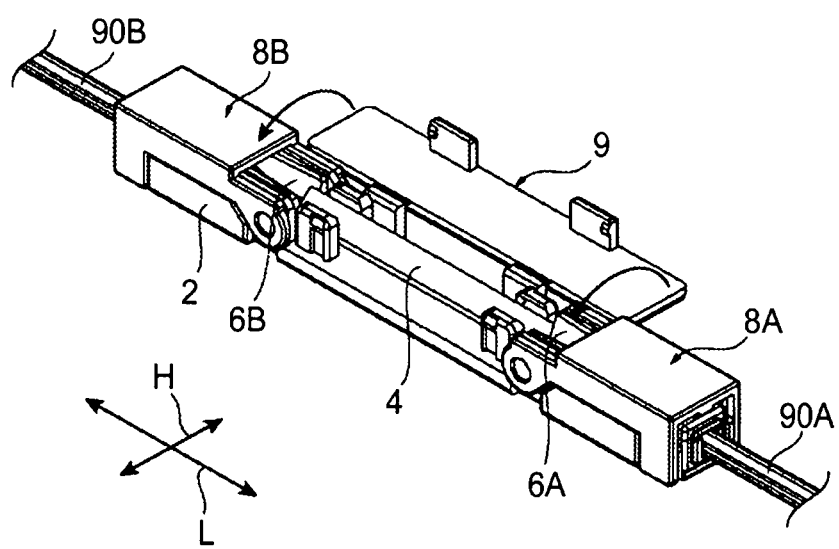
FIG. 17 is a diagram for explaining the next process of the process illustrated in FIG. 16.
Figure 18:
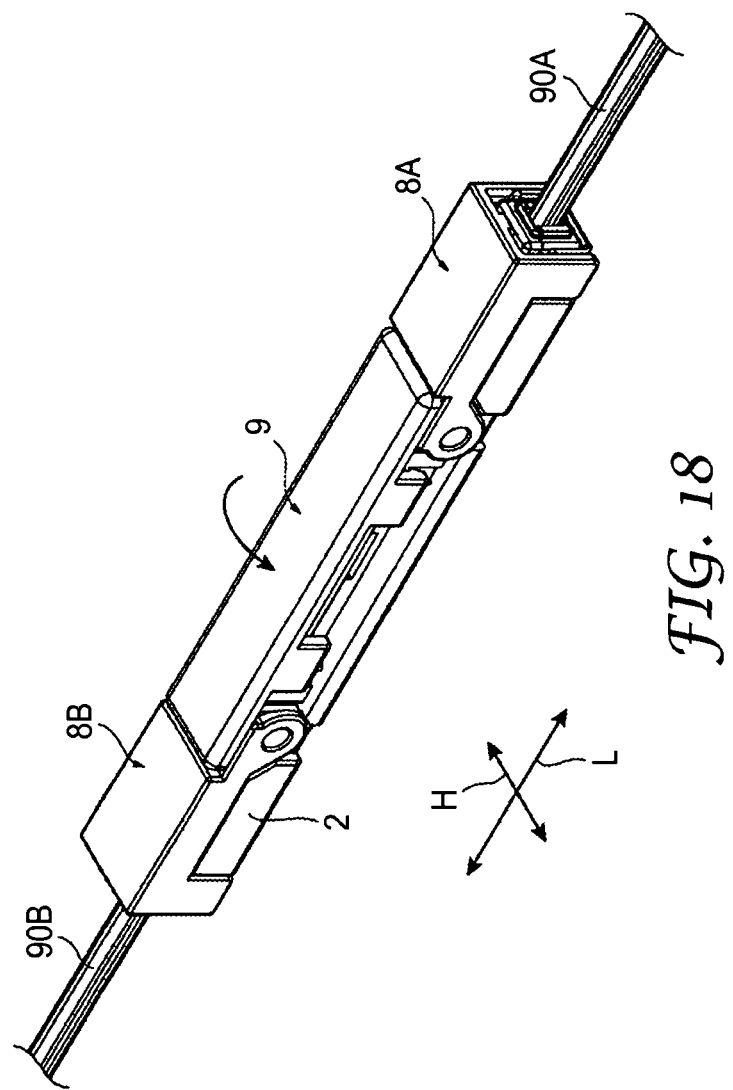
FIG. 18 is a diagram for explaining the next process of the process illustrated in FIG. 17.

Next, as illustrated in FIG. 17, the side cover 8A is closed to cover the fiber lifter 6A and the cable holder 3A and to fix the side cover 8A to the body 2. Similarly, the side cover 8B is closed to cover the fiber lifter 6B and the cable holder 3B and to fix the side cover 8B to the body 2. Furthermore, as illustrated in FIG. 18, the center lever 9 is closed. In this manner, the optical fibers 91A and 91B where end surfaces have been matched together in the mechanical splice 4 are mechanically sandwiched and held. According to the steps given above, the optical fibers 91A and 91B are optically connected together, and the metal wires 92a and 92b are electrically connected together.

With the optical fiber cable splicing box 1 of the embodiment given above, optical fibers 91A and 91B are optically connected together by the mechanical splice 4 for a pair of optical fiber cables 90A and 90B, and the metal wires 92a and 92b are electrically connected together by the contact portions 80A and 80B and the metal plate 5. In this manner, an electrical connection at the time of connecting optical fiber cables 90A and 90B can be easily secured, and the optical fiber cables 90A and 90B can be quickly connected together.

Therefore, according to this embodiment, the optical fiber cables 90A and 90B can be easily and quickly connected together. As a result, using the optical fiber cable splicing box 1 in the vicinity of a house of a user when pulling aerial wiring system optical fiber cables to the user, for example, allows optical fiber cables 90A and 90B to be electrically connected together while the optical fiber cables 90A and 90B are grounded together. Therefore, the pulling of aerial wiring system optical fiber cables can be favorably implemented.

Further, as described above, after the work to optically connect the optical fibers 91A and 91B together by the mechanical splice 4 has been completed, the first and second metal wires 92a and 92b of the optical fiber cable 90A will be in an electrically connected state with the first and second metal wires 92a and 92b of the optical fiber cable 90B. Therefore, other than the work to connect the optical fibers 91A and 9lB, separate work to connect the first metal wires 92a and the second metal wires 92b is not necessary, and thus, the optical fiber cable 90A can be quickly connected to the optical fiber cable 90B.

In addition, as described above, the first connection portion 84c in the first contact portion 81 sandwiches only the first metal wire 92a. According to this type of configuration, the second metal wire 92b widening the width of the groove 84 prevents a gap from being generated between the first connection portion 84c and the first metal wire 92a.

Accordingly, the first contact portion 81 can be made to securely conduct with the first metal wire 92a.

In addition, the first connection portion 85c in the second contact portion 82 sandwiches only the second metal wire 92b. According to this type of configuration, the first metal wire 92a widening the width of the groove 85 prevents a gap from being generated between the first connection portion 85c and the second metal wire 92b. Accordingly, the second contact portion 82 can be made to securely conduct with the second metal wire 92b.

In addition, as described above, because the contact portions 80A and 80B are integrally formed, the contact portions 80A and 80B can be placed with a single pressing operation into the cable holders 3A and 3B. Furthermore, because the first contact portion 81 conducts with the second contact portion 82 via the base portion 83, the first and second metal wires 92a and 92b can be connected to the same ground potential.

Note that because the metal wires 92a and 92b of the optical fiber cables 90A and 90B are electrically connected together, an electrical failure in the optical fiber cables 90A and 90B can be confirmed based on the existence of for example, conductivity between the metal wires 92a and 92b of the optical fiber cable 90A and the metal wires 92a and 92b of the optical fiber cable 90B.

Second Embodiment

Next, a description will be given of an optical fiber cable splicing box according to a second embodiment. Note that, in the description of this embodiment, descriptions will be given mainly of points that differ from the first embodiment.

Figure 19:
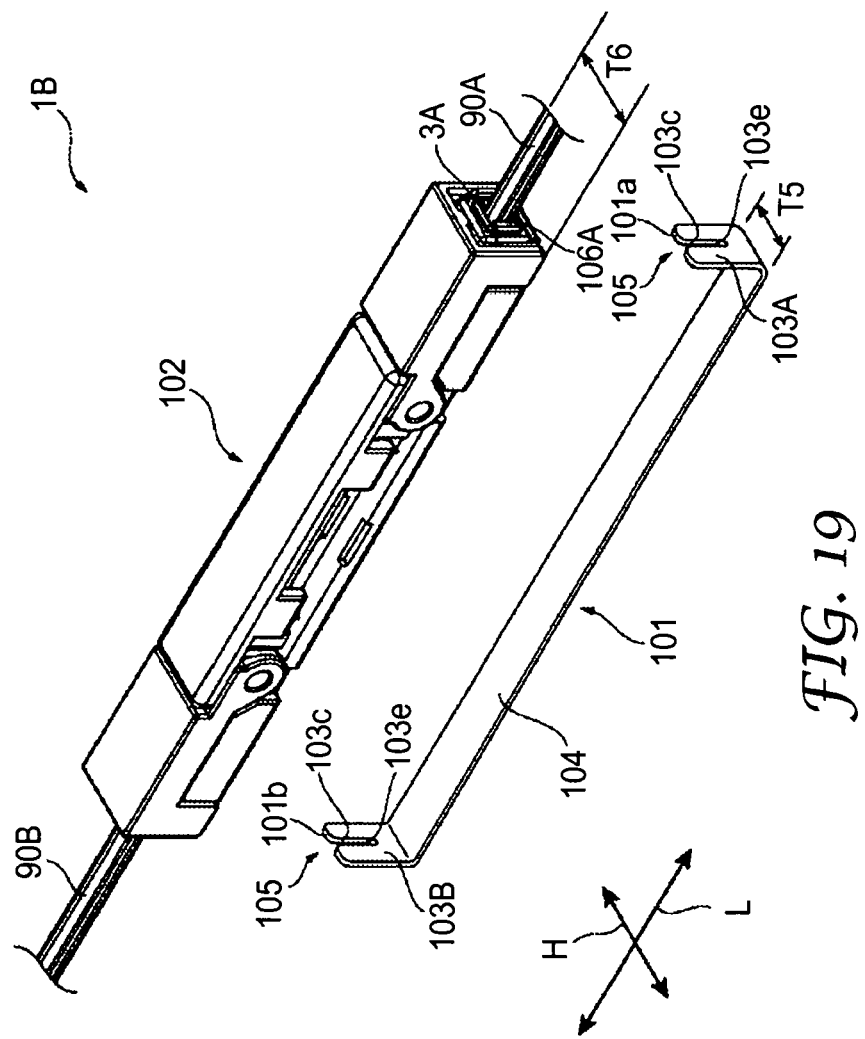
FIG. 19 is a perspective view illustrating an optical fiber cable splicing box according to a second embodiment.
Figure 20:
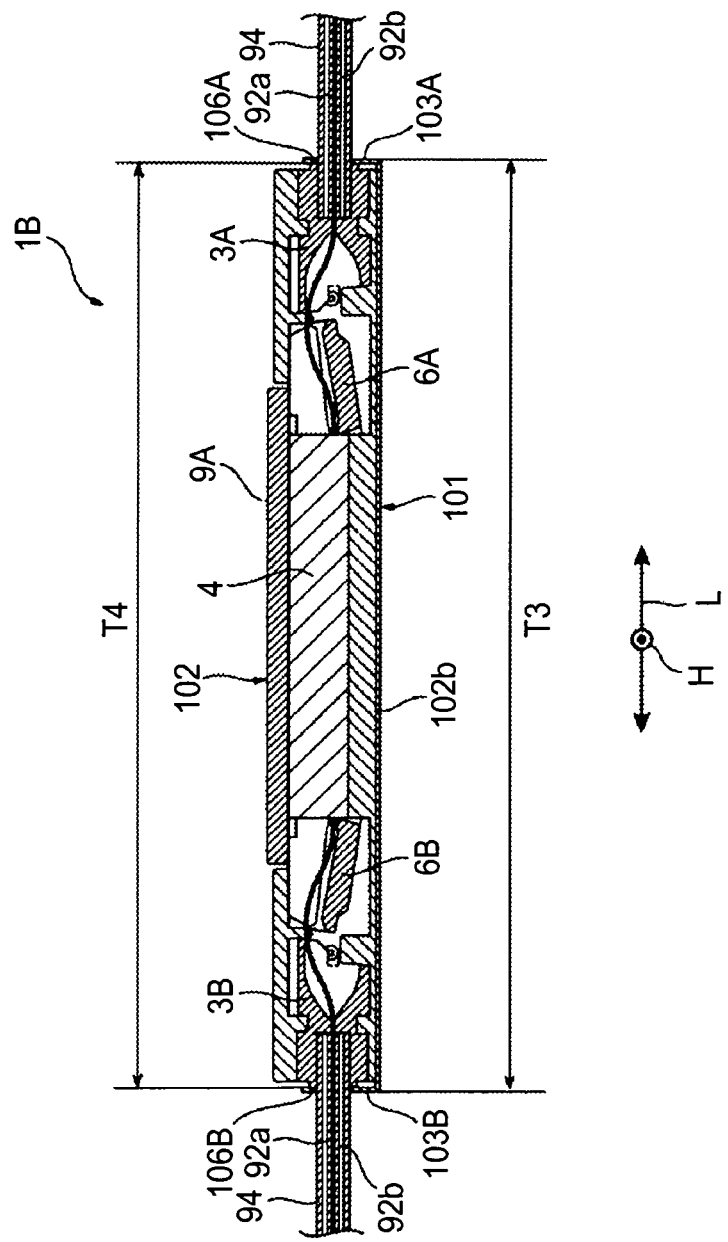
FIG. 20 is a cross-sectional view illustrating the optical fiber cable splicing box according to the second embodiment.

As illustrated in FIGS. 19 and 20, an optical fiber cable splicing box 1B of this embodiment differs from the optical fiber cable splicing box 1 described above in regard to the point that the optical fiber cables 90A and 90B are electrically connected together using a connection member 101.

The connection member 101 has a contact portion 103A that conducts with the first and second metal wires 92a and 92b of the optical fiber cable 90A, a contact portion 103B that conducts with the first and second metal wires 92a and 92b of the optical fiber cable 90B, and a bridge portion 104 that extends between the contact portions 103A and 103B.

The contact portions 103A and 103B are connected so as to be orthogonal to end portions 101a and 101b in the length direction of the bridge portion 104. In other words, the contact portions 103A and 103B and the bridge portion 104 are formed bent to be substantially orthogonal to both end portions of the metal plate that extends in the predetermined direction L. These contact portions 103A and 103B have a groove portion 105 that extends in the direction that the contact portions 103A and 103B extend.

The groove portion 105 has, in order from the end portion 101a (101b) side, a first connection portion 103c that is conducting with the first metal wire 92a and a first connection portion 103e that is conducting with the second metal wire 92b. The optical fiber 91A (91B) is inserted between the first connection portions 103c and 103e.

This type of contact portion 103A is provided in the vicinity (periphery) of the cable holder 3A, and the contact portion 103B is provided in the vicinity of the cable holder 3B. In other words, these contact portions 103A and 103B are installed in positions separated by only a predetermined length from the cable holders 3A and 3B, respectively. Here, the contact portion 103A is provided to abut against the end surface 106A of the outer side of the cable holder 3A, and the contact portion 103B is provided to abut against the end surface 106B of the outer side of the cable holder 3B (see FIG. 20).

The bridge portion 104 is a flat plate having a rectangular shape that extends in the predetermined direction L. A length T3 of the bridge portion 104 is made to be substantially similar to, or longer than, a length T4 in the predetermined direction L of the optical fiber cable splicing box 102. A width T5 of the bridge portion 104 is made to be substantially similar to, or shorter than, a length T6 in the width direction H of the optical fiber cable splicing box 102.

In the optical fiber cable splicing box 1B configured as described above, optical fibers 91A and 91B are optically connected using the optical fiber cable splicing box 102. In addition, the connection member 101 is attached and fixed to the optical fiber cables 90A and 90B. Here, the bridge portion 104 is arranged to abut from the bottom side of the optical fiber cable splicing box 102 (in other words, from the bottom portion 22 of the body 2).

At this time, each of the contact portions 103A and 103B penetrate the jacket 94 of the optical fiber cables 90A and 90B and contact the first and second metal wires 92a and 92b without contacting the optical fibers 91A and 91B. In this manner, the first and second metal wires 92a and 92b of the optical fiber cable 90A are electrically connected to the first and second metal wires 92a and 92b of the optical fiber cable 90B.

Also in the optical fiber cable splicing box 1B according to this embodiment given above, the metal wires 92a and 92b of the optical fiber cable 90A can be easily connected to the metal wires 92a and 92b of the optical fiber cable 90B, and the optical fiber cables 90A and 90B can be quickly connected together. Furthermore, with the optical fiber cable splicing box 1B, conventional optical fiber cable splicing boxes that optically connect together optical fibers can be used as the optical fiber cable splicing box 102.

Descriptions are given above of favorable embodiments of the present invention, however, the present invention is not limited to the embodiments given above and may be modified or applied to other applications within a scope that does not change the elements described in the claims.

Figure 21A:
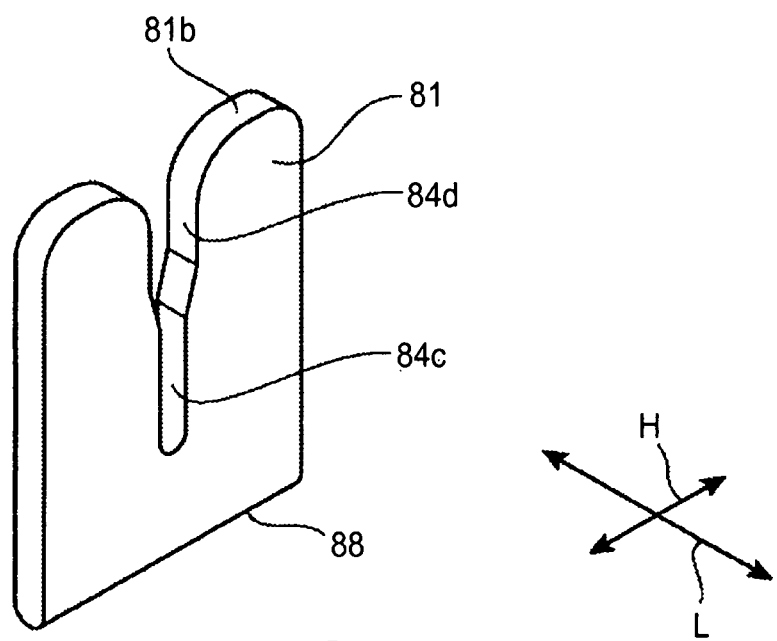
FIGS. 21a and 21b are two perspective views illustrating the first and second contact portions for a first modified example of an optical fiber cable splicing box.
Figure 21B:
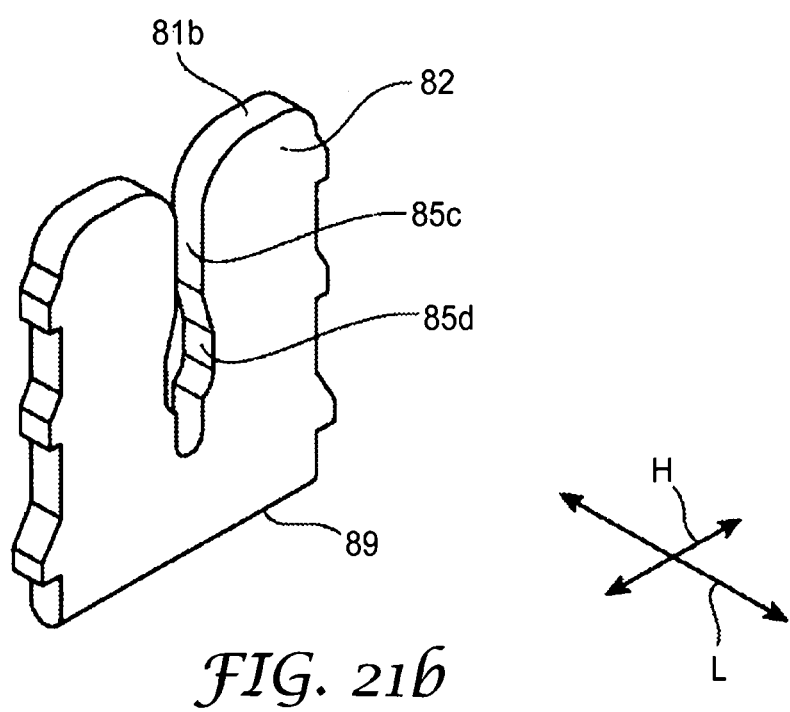

For example, in the first embodiment given above, the first and second contact portions 81 and 82 are integrally formed with a base portion 83, however, the invention is not limited to this. For example, as illustrated in FIGS. 21a and 21b, the respective first and second contact portions 81 and 82 may also be separate components formed individually. In this case, the end portion 88 at the opposite side of the end portion 81b in the first contact portion 81 and the end portion 89 at the opposite side of the end portion 82b in the second contact portion 82 may configure the second connection portion that is electrically connected to the bridge portion and these correspond to the base portion 83.

Figure 22:
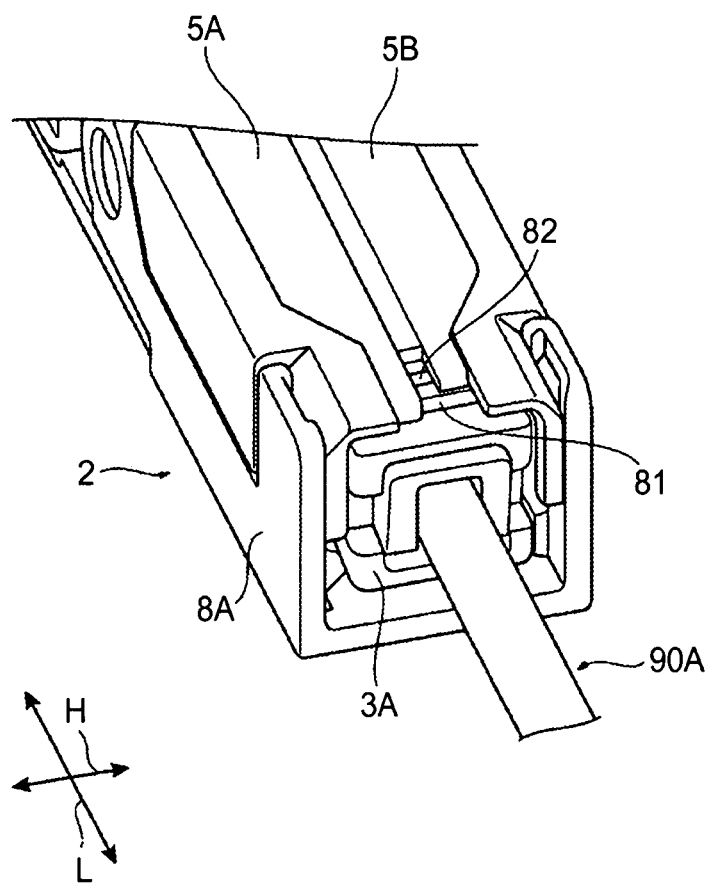
FIG. 22 is another perspective view illustrating the first modified example of an optical fiber cable splicing box.

Note that, in this case, as illustrated in FIG. 22, the bridge portion may be formed separately as a first bridge portion 5A that is electrically connected to only the first contact portion 81 and a second bridge portion 5B that is electrically connected to only the second contact portion 82. According to this type of configuration, the first and second metal wires 92a and 92b can be connected to mutually different ground potentials.

Figure 23:
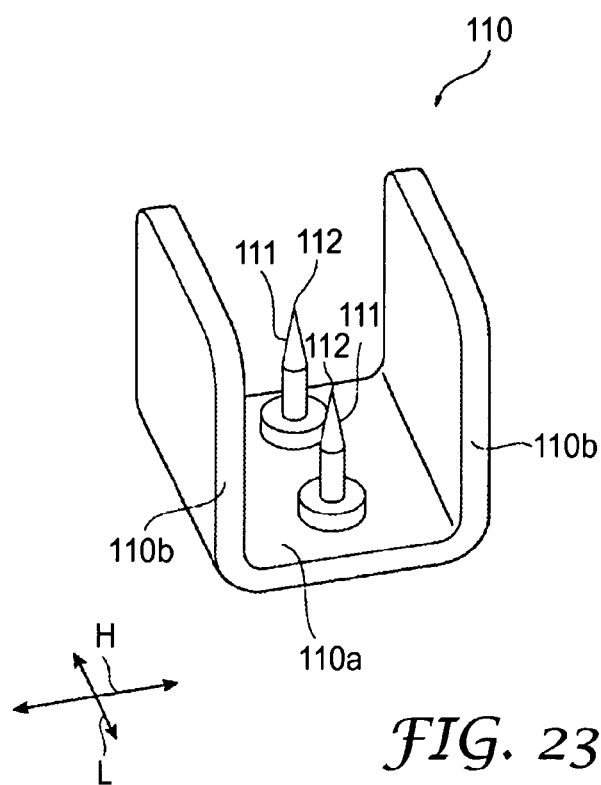
FIG. 23 is a perspective view illustrating a second modified example of an optical fiber cable splicing box.

Furthermore, the contact portion is not limited to the embodiments described above. For example, as illustrated in FIG. 23, a contact portion 110 may have a needle shaped first connection portion 111. Specifically, the contact portion 110 has a base portion 110a that is a plate shaped member bent in a U shape when viewed from the width direction H, which corresponds to the base portion 83 given above, and a pair of plate shaped wall portions 110b that extend to mutually oppose from both ends of the base portion 110a. In the base portion 110a, a plurality (here, two) of first connection portions 111 is set in parallel and are provided to protrude in the direction that the wall portion 110b extends. A tip end portion 112 forming a point is formed on the first connection portion 111.

With this contact portion 110, respective tip end portions 112 of the first connection portion 111 penetrate the jacket 94 of the optical fiber cable 90A (90B). Furthermore, while one first connection portion 111 contacts the first metal wire 92a to electrically conduct, the other first connection portion 111 contacts the second metal wire 92b to electrically conduct.

Figure 24:
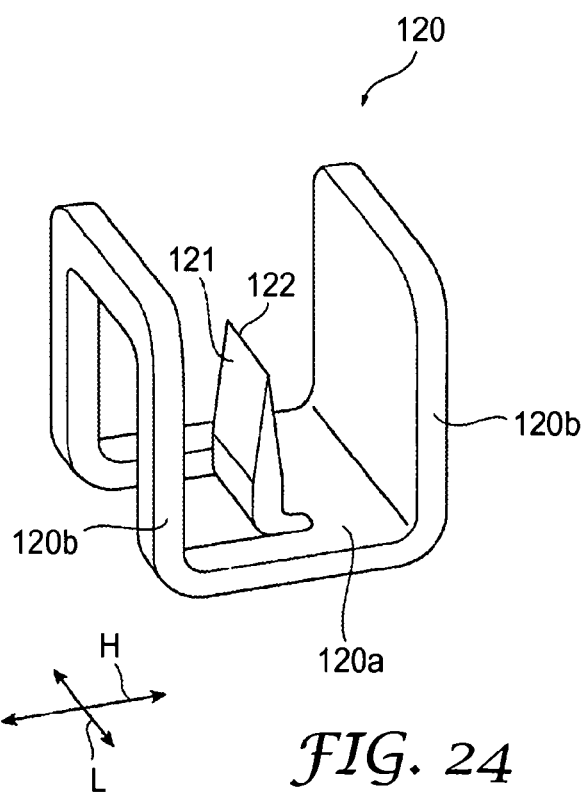
FIG. 24 is a perspective view illustrating a third modified example of an optical fiber cable splicing box.

Furthermore, for example, as illustrated in FIG. 24, the contact portion 120 may have a first connection portion 121 in the shape of a blade. Specifically, the contact portion 120 has a base portion 120a that is a plate shaped member bent in a U shape when viewed from the width direction H, which corresponds to the base portion 83 given above, and a pair of plate shaped wall portions 120b that extend to mutually oppose from both ends of the base portion 120a. In the base portion 120a, a first connection portion 121 is provided to protrude in the direction that the wall portion 120b extends. The first connection portion 121 has a blade portion 122 where the tip end side thereof is in the shape of a blade.

With this contact portion 120, the blade portion 122 of the first connection portion 121 penetrates the jacket 94 of the optical fiber cable 90A (90B). Furthermore, the blade portion 122 on the first connection portion 121 contacts the first and second metal wires 92a and 92b to electrically conduct.

Further, in the embodiment given above, a metal plate 5 having a hole portion 5a was used as the bridge portion, but this hole portion 5a may also not be formed. In addition, the bridge portion may not be plate shaped. Indeed, the bridge portion may be any configuration as long as the contact portions are electrically connected together. Further, in the embodiment given above, the fiber lifters 6A and 6B may not be provided.

Figure 25:
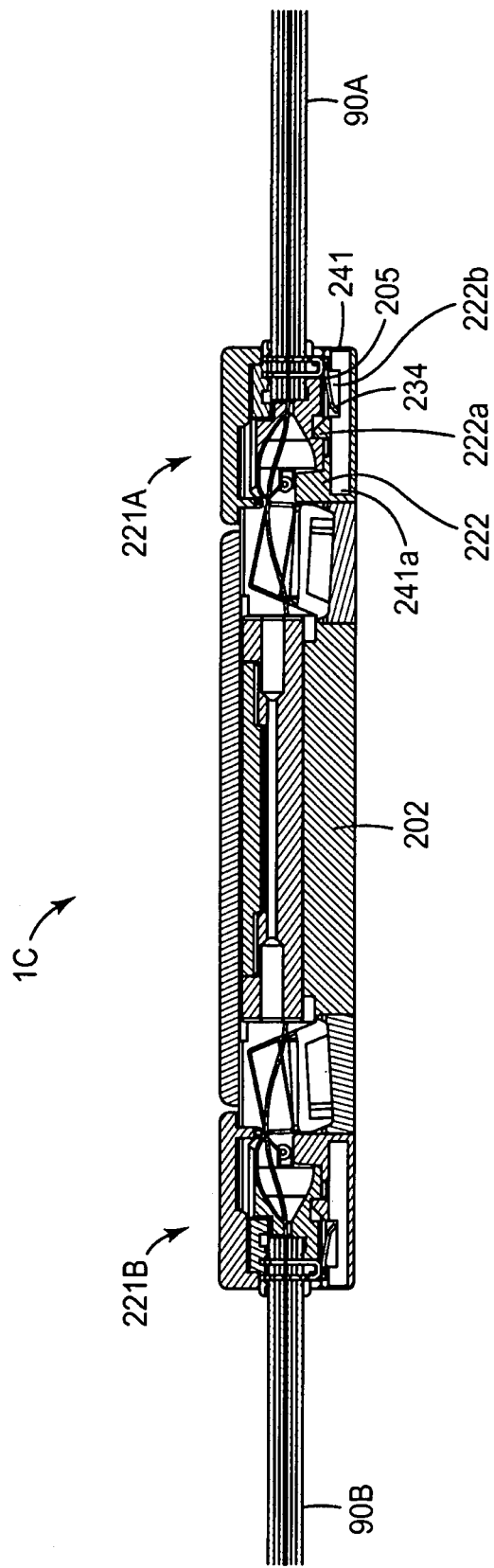
FIG. 25 is a cross-sectional view illustrating a fourth modified example of an optical fiber cable splicing box.
Figure 26:
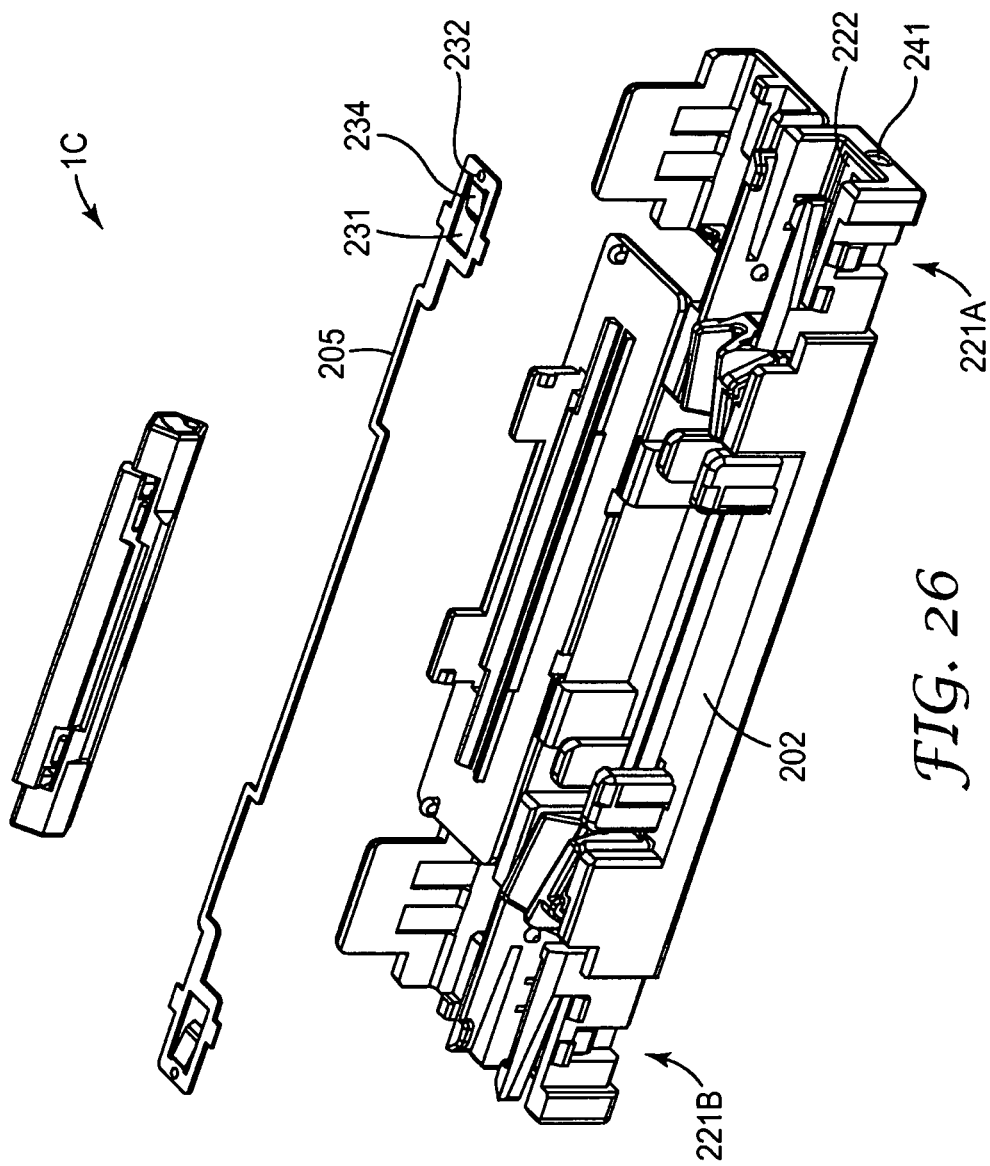
FIG. 26 is an exploded perspective view illustrating the fourth modified example of an optical fiber cable splicing box.
Figure 27A:
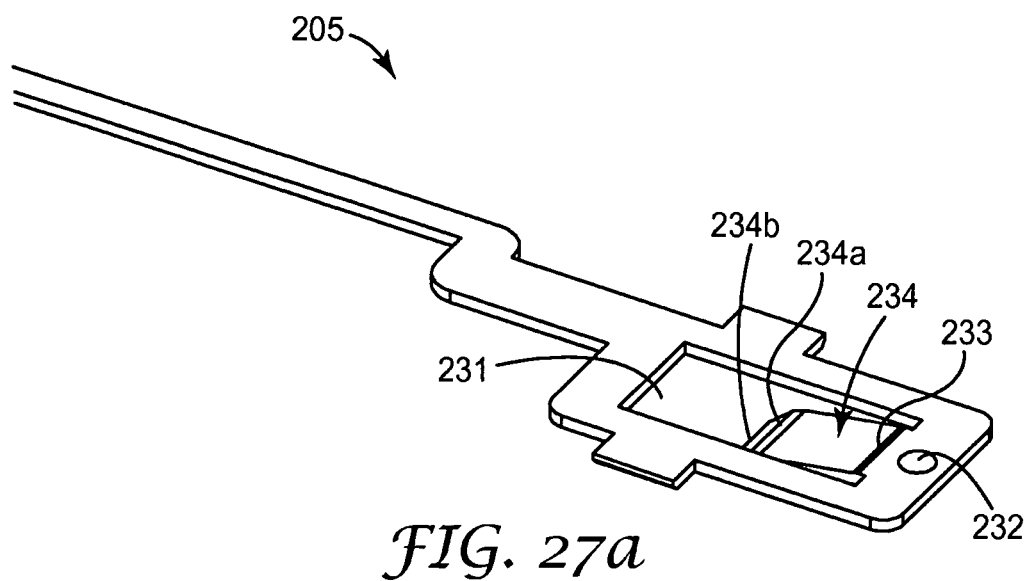
FIGS. 27a and 27b are two enlarged views of the metal plate end portion according to the fourth modified example of an optical fiber cable splicing box.
Figure 27B:
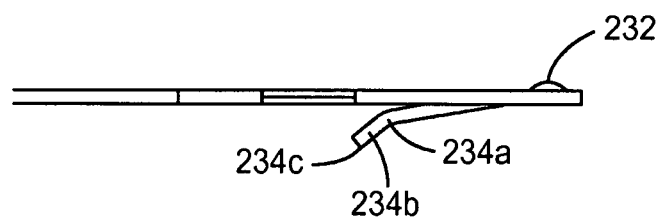

In addition, as described above, the metal plate 5 and the body 2 can be provided with a configuration for grounding the metal wires 92a and 92b of the optical fiber cable 90A and/or the metal wires 92a and 92b of the optical fiber cable 90B. As illustrated in FIG. 25 to FIG. 27, with a metal plate 205 of an optical fiber cable splicing box 1C, a substantially rectangular ground wire contact 234 is provided, via a coupling portion 233, on an edge of a connection portion 232 side of a hole portion 231 that engages with a projection portion 222a of the body 2. An end portion 234b of the ground wire contact 234 that faces the coupling portion 233 has a curved section 234a that curves towards the opposite surface side of the connection portion 232 and is formed so that an angle of an edge 234c on the opposite surface side from the surface where the connection portion 232 is provided will be substantially perpendicular or an acute angle.

Insertion holes 241 for inserting the ground wires are provided on the opposite side of the holder retaining sections 221A and 221B sandwiching the bottom portion 222 on both end parts in the predetermined direction L of the body 202. A through hole 222b that connects the insertion hole 241 with the holder retaining sections 221A and 221B is provided in a position facing the ground wire contact 234 of the bottom portion 222. Additionally, through the through hole 222b, the edge 234c of the ground wire contact 234 that curves into the insertion hole 241 side is positioned to enclose a portion of the lateral cross-section of the insertion hole 241 with the curved section 234a.

Figure 28A:
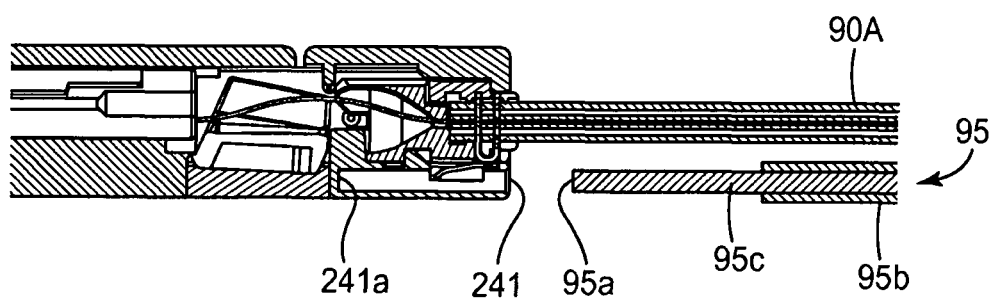
FIGS. 28a and 28b are two cross-sectional views illustrating a ground wire connection step in the fourth modified example of an optical fiber cable splicing box.
Figure 28B:
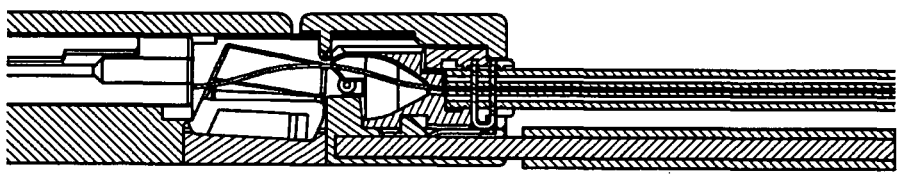
Figure 29:
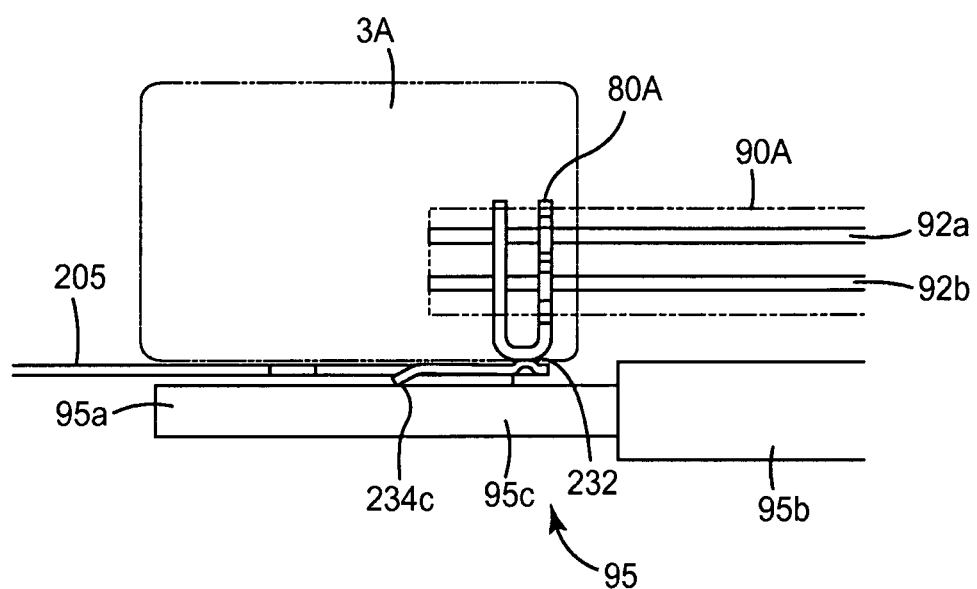
FIG. 29 is a cross-sectional view illustrating a connected state of the metal wire, contact portion, metal plate, and ground wire in the fourth modified example of an optical fiber cable splicing box.

In the optical fiber cable splicing box 1C, after the optical fiber cables 90A and 90B are connected by similar steps to those of the optical fiber cable splicing box 1, a predetermined length of a covering 95b is removed at a terminal 95a of the ground wire 95 to expose a conductor 95c, and the terminal 95a is inserted into the insertion hole 241 until the terminal 95a reaches a bottom 241a of the insertion hole 241 as illustrated in FIG. 28. In this manner, the conductor 95c of the ground wire 95 contacts the metal plate 205 via the edge 234c of the end portion 234b of the ground wire contact 234 that is curved to the ground wire 95 side by the curved section 234a such that an electrically connected state with the contact portion 80A as well as with the metal wires 92a and 92b is secured (FIG. 29). In addition, because the angle of the edge 234c is formed to be substantially perpendicular or an acute angle, the state of contact with the conductor 95c of the ground wire 95 where the edge 234c has been inserted is further reinforced, and thus, the ground wire 95 is prevented from falling or being pulled out from the insertion hole 241.

Figure 30:
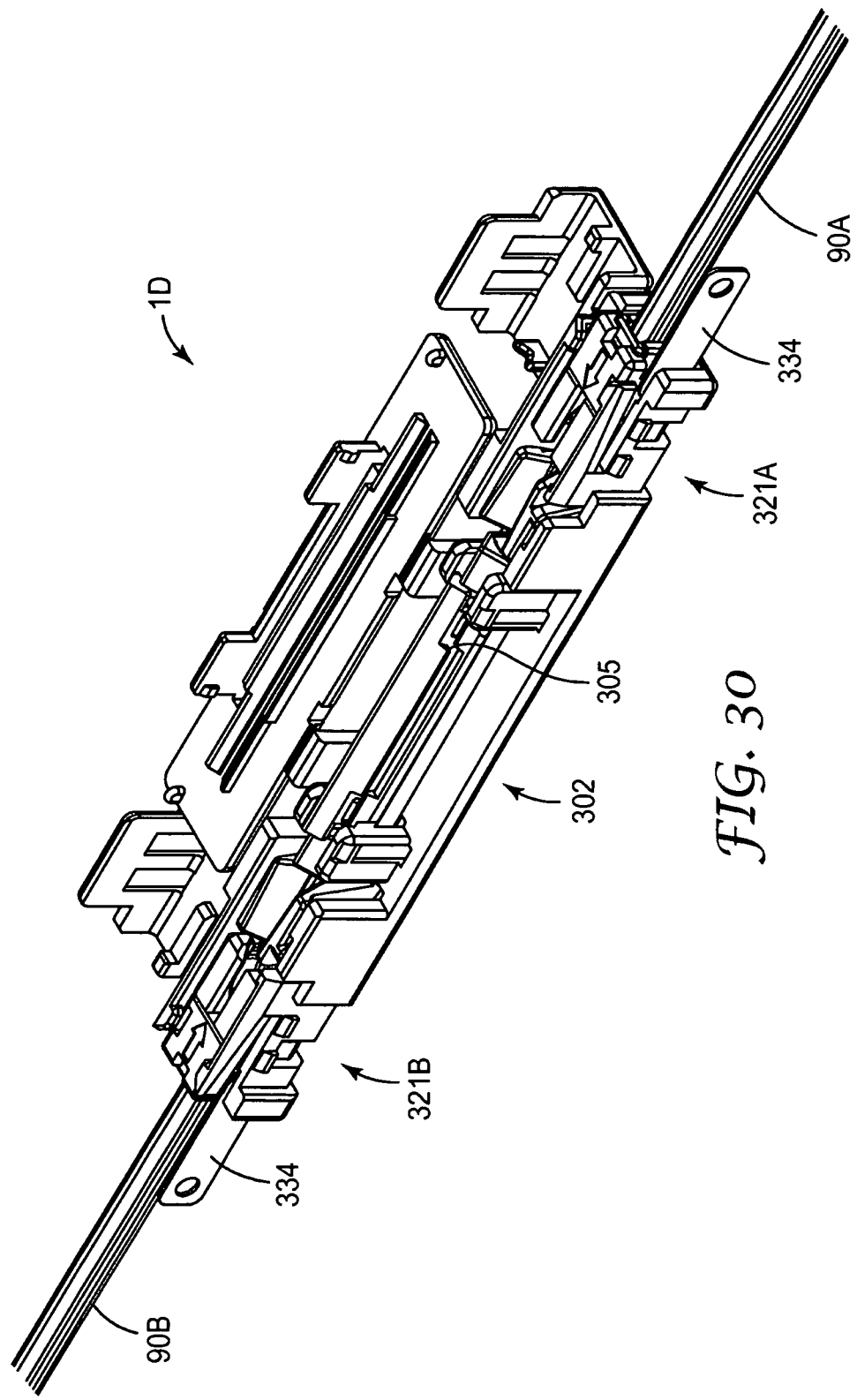
FIG. 30 is a perspective view illustrating a fifth modified example of an optical fiber cable splicing box.
Figure 31:
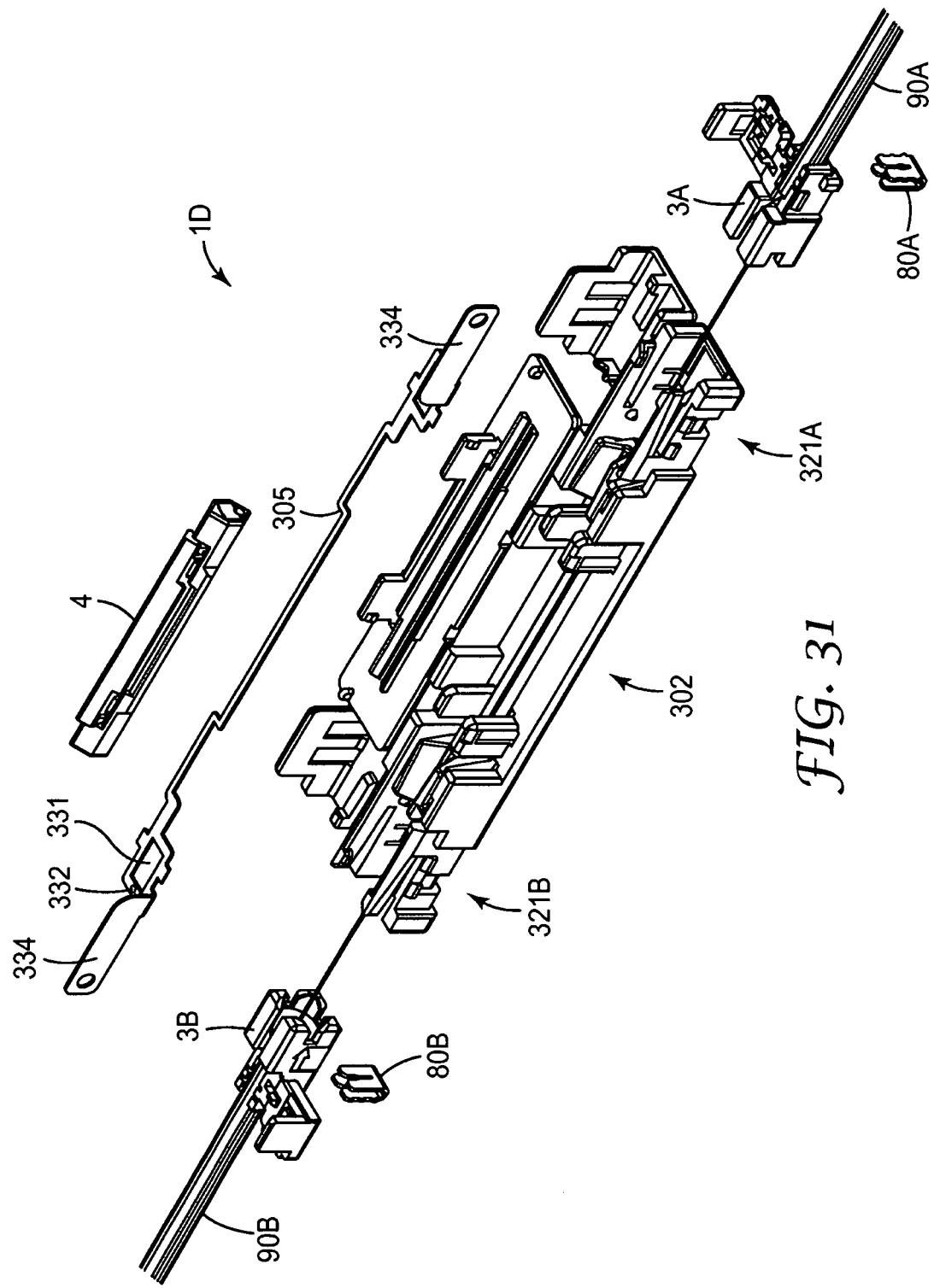
FIG. 31 is an exploded perspective view illustrating the fifth modified example of an optical fiber cable splicing box.
Figure 32:
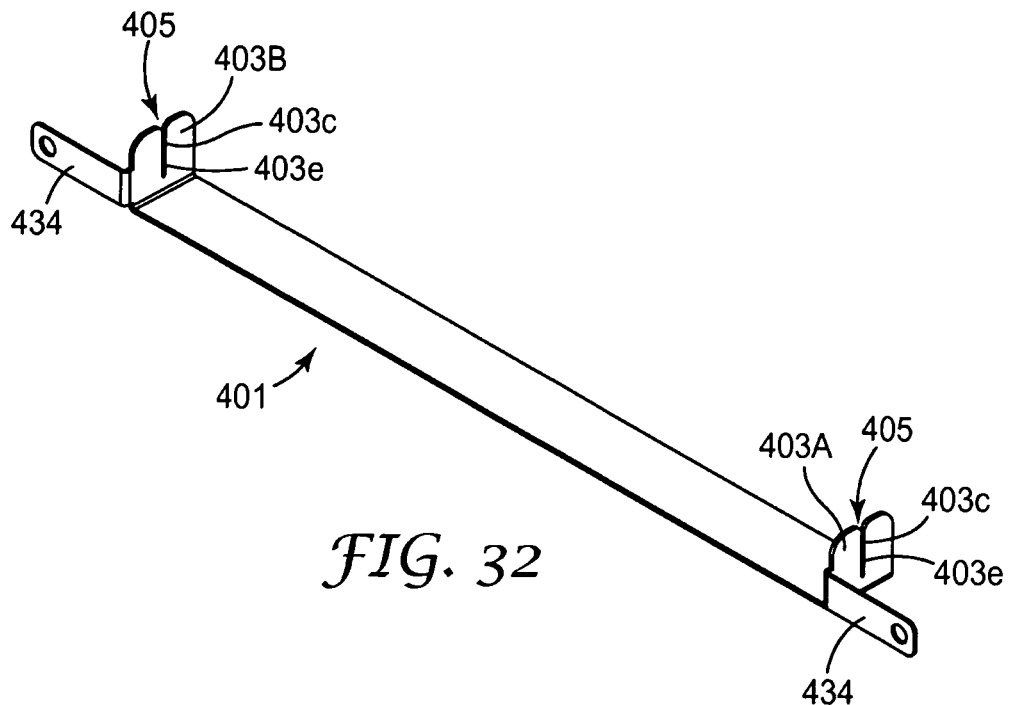
FIG. 32 is a perspective view illustrating a connection member according to a sixth modified example of an optical fiber cable splicing box.
Figure 33:
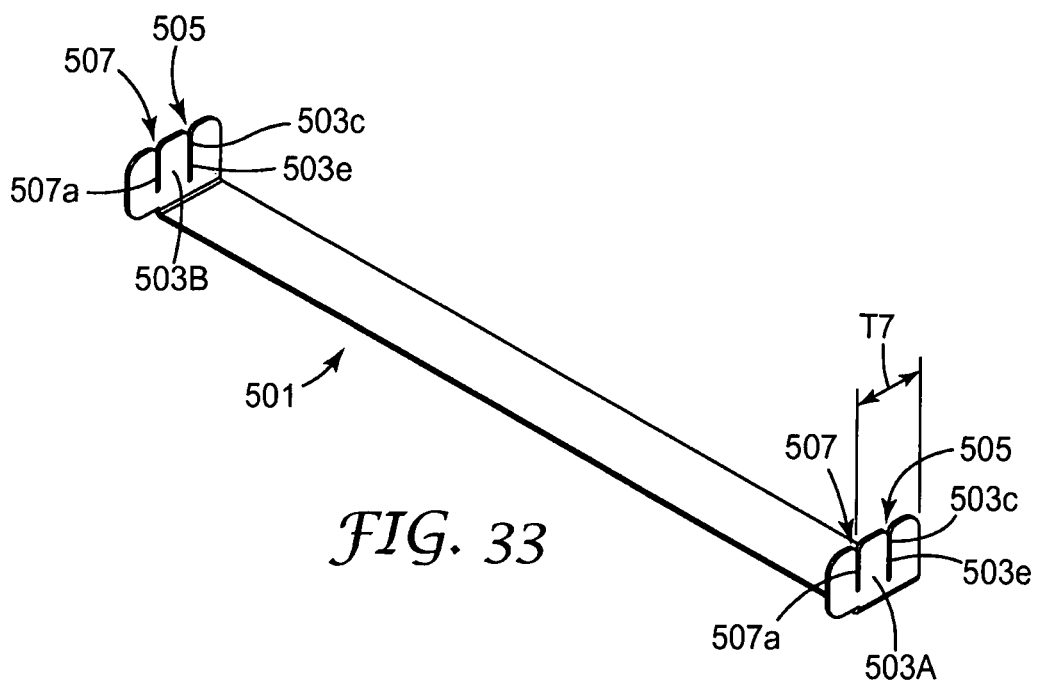
FIG. 33 is a perspective view illustrating a connection member according to a seventh modified example of an optical fiber cable splicing box.

The configuration for grounding the metal wires 92a and 92b of the optical fiber cable 90A and/or the metal wires 92a and 92b of the optical fiber cable 90B is not limited to the configuration described above, and, for example, a ground wire connection terminal 334 that is electrically connected to the metal plate 305 may be provided on an outside portion of the body 302 in an optical fiber cable splicing box 1D as illustrated in FIGS. 30 and 31. Further, instead of the connection member 101 in the optical fiber cable splicing box 1B illustrated in FIG. 19, a connection member 401, such as that illustrated in FIG. 32, or a connection member 501, such as that illustrated in FIG. 33, may be used.

With the connection member 401, groove portions 405, having a first connection portion 403c conducting with the first metal wire 92a and a first connection portion 403e conducting with the second metal wire 92b, are provided on contact portions 403A and 403B, and a ground wire connection terminal 434 extends from the side edge of the contact portions 403A and 403B in the predetermined direction L.

Further, with the connection member 501, groove portions 505, having a first connection portion 503c conducting with the first metal wire 92a and a first connection portion 503e conducting with the second metal wire 92b, are provided on contact portions 503A and 503B, and the groove 507 having a ground wire connection portion 507a is provided on the contact portions 503A and 503B nearly parallel to the groove 505. A length T7, which is a distance from the side edge opposite the groove 507 to the groove 507 across the groove 505, of the contact portions 503A and 503B exceeds the length T6 in the width direction H of the optical fiber cable splicing box 102, and thus, the ground wire 95 is inserted into the groove 507 avoiding the optical fiber cable splicing box 102 and can conduct with the ground wire connection portion 507a.

In addition, although not illustrated, as long as the ground wire connection terminal can secure an electrical connection with the metal plate 5 or the contact portion 80A through an opening portion or the like provided in the body 2, the ground wire connection terminal may be provided separately and is not required to be integrally formed with the metal plate 5.

Furthermore, the optical fiber cables 90A and 90B are not limited to an optical drop cable and may be applied to various types of optical fiber cables. For example, the metal wire contained in the optical fiber cable may be a single wire or may be three or more wires. In addition, the present invention can achieve an optical fiber cable connection method that can match and connect together in a predetermined direction ends of a pair of optical fiber cables having a metal wire and an optical fiber.

What is claimed is:

1. An optical fiber cable splicing box that matches and connects together in a predetermined direction ends of a pair of optical fiber cables having a metal wire and an optical fiber, the splicing box comprising:
    a pair of cable holders provided aligned in the predetermined direction that respectively grip jackets of a pair of the optical fiber cables;
    a body where a pair of the cable holders are fixed;
    an optical connector fixed to the body that optically connects together ends of the optical fiber in a pair of the optical fiber cables;
    a pair of contact portions having conductivity provided respectively on the pair of the cable holders or near the pair of the cable holders; and
    a bridge portion having conductivity that extends in the predetermined direction;
    wherein the contact portion includes:
    a first connection portion that is electrically connected to the metal wire of the optical fiber cable by penetrating into the jacket; and
    a second connection portion that is electrically connected to the bridge portion while electrically conducting with the first connection portion,
    wherein the optical fiber cable includes a first metal wire and a second metal wire as the metal wire; and the contact portion includes at least one of a first contact portion that is electrically connected to the first metal wire and a second contact portion that is electrically connected to the second metal wire.

2. The optical fiber cable splicing box according to claim 1, wherein the contact portion is provided on the cable holder so that the second connection portion is exposed from the cable holder; and
    the bridge portion is electrically connected to the second connection portion exposed from the cable holder in a state where the cable holder is fixed to the body.

3. The optical fiber cable splicing box according to claim 1, wherein the first connection portion in the first contact portion sandwiches the first metal wire in a state where a gap is provided with the second metal wire, so as to be electrically connected with only the first metal wire; and
    the first connection portion in the second contact portion sandwiches the second metal wire in a state where a gap is provided with the first metal wire, so as to be electrically connected with only the second metal wire.

4. The optical fiber cable splicing box according to claim 1, wherein the first contact portion and the second contact portion are integrally formed.

5. The optical fiber cable splicing box according to claim 1, wherein the first contact portion and the second contact portion are formed separately; and the bridge portion includes a first bridge portion electrically connected to only the first contact portion and a second bridge portion electrically connected to only the second contact portion.

6. The optical fiber cable splicing box according to claim 1, wherein the bridge portion is electrically connected to the first connection portion.

7. The optical fiber cable splicing box according to claim 6, wherein the first connection portion is provided inside the body; and
    the body has at least one insertion hole where a ground wire for grounding the metal wire can have access to the first connection portion.

* * * * *